(12) United States Patent
Hira et al.

(10) Patent No.: US 10,862,753 B2
(45) Date of Patent: Dec. 8, 2020

(54) HIGH AVAILABILITY FOR STATEFUL SERVICES IN PUBLIC CLOUD LOGICAL NETWORKS

(71) Applicant: Nicira, Inc., Palo Alto, CA (US)

(72) Inventors: Mukesh Hira, Los Altos, CA (US); Ganesan Chandrashekhar, Campbell, CA (US); Jayant Jain, Palo Alto, CA (US); Rahul Jain, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/831,372

(22) Filed: Dec. 4, 2017

(65) Prior Publication Data

US 2019/0173757 A1    Jun. 6, 2019

(51) Int. Cl.
*H04L 12/24* (2006.01)
*H04L 12/717* (2013.01)
*H04L 12/14* (2006.01)
*H04M 15/00* (2006.01)

(52) U.S. Cl.
CPC ...... *H04L 41/0893* (2013.01); *H04L 12/1435* (2013.01); *H04L 41/0806* (2013.01); *H04L 41/12* (2013.01); *H04L 45/42* (2013.01); *H04M 15/60* (2013.01); *H04M 15/8033* (2013.01); *H04M 15/8083* (2013.01); *H04M 15/8088* (2013.01)

(58) Field of Classification Search
CPC ............. H04L 41/0893; H04L 12/1435; H04L 41/0806; H04L 41/12; H04L 45/42
See application file for complete search history.

(56) References Cited

U.S. PATENT DOCUMENTS

| 6,108,300 A | 8/2000 | Coile et al. |
| 6,832,238 B1 * | 12/2004 | Sharma ............... G06F 9/466 707/999.003 |
| 7,107,360 B1 | 9/2006 | Phadnis et al. |
| 7,360,245 B1 | 4/2008 | Ramachandran et al. |

(Continued)

FOREIGN PATENT DOCUMENTS

| CN | 107534603 A | 1/2018 |
| EP | 1742430 A1 | 1/2007 |

(Continued)

OTHER PUBLICATIONS

Non-Published commonly Owned U.S. Appl. No. 15/831,369, filed Dec. 4, 2017, 47 pages, Nicira Inc.

(Continued)

*Primary Examiner* — Kevin C. Harper
*Assistant Examiner* — Derrick V Rose
(74) *Attorney, Agent, or Firm* — Adeli LLP

(57) ABSTRACT

Some embodiments provide a method for a network controller that manages a logical network spanning multiple physical locations. For each physical location hosting data compute nodes (DCNs) belonging to the logical network, the method defines a centralized routing component for processing data messages between the DCNs hosted at the physical location and networks external to the logical network, assigns an active instance of the centralized routing component to operate at the physical location, and assigns a standby instance of the centralized routing component to operate at one of the other physical locations.

22 Claims, 13 Drawing Sheets

(56) References Cited

U.S. PATENT DOCUMENTS

| | | |
|---|---|---|
| 7,423,962 B2 | 9/2008 | Auterinen |
| 7,523,485 B1 | 4/2009 | Kwan |
| 7,953,895 B1 | 5/2011 | Narayanaswamy et al. |
| 8,264,947 B1* | 9/2012 | Tavares .................. H04L 43/10 370/216 |
| 8,296,434 B1 | 10/2012 | Miller et al. |
| 8,432,791 B1* | 4/2013 | Masters .................. H04L 1/22 370/221 |
| 8,719,590 B1 | 5/2014 | Faibish et al. |
| 8,902,743 B2 | 12/2014 | Greenberg et al. |
| 8,958,293 B1 | 2/2015 | Anderson |
| 9,244,669 B2 | 1/2016 | Govindaraju et al. |
| 9,356,866 B1 | 5/2016 | Isivaramakrishnan et al. |
| 9,413,730 B1 | 8/2016 | Narayan et al. |
| 9,485,149 B1* | 11/2016 | Traina .................. H04L 29/06 |
| 9,519,782 B2 | 12/2016 | Aziz et al. |
| 9,590,904 B2 | 3/2017 | Heo et al. |
| 9,699,070 B2 | 7/2017 | Davie et al. |
| 9,832,118 B1 | 11/2017 | Miller et al. |
| 9,871,720 B1 | 1/2018 | Tillotson |
| 10,135,675 B2 | 11/2018 | Yu et al. |
| 10,193,749 B2 | 1/2019 | Hira et al. |
| 10,228,959 B1 | 3/2019 | Anderson et al. |
| 10,326,744 B1 | 6/2019 | Nossik et al. |
| 10,333,959 B2 | 6/2019 | Katrekar et al. |
| 10,341,371 B2 | 7/2019 | Katrekar et al. |
| 10,348,767 B1 | 7/2019 | Lee et al. |
| 10,367,757 B2 | 7/2019 | Chandrashekhar et al. |
| 10,397,136 B2 | 8/2019 | Hira et al. |
| 10,484,302 B2 | 11/2019 | Hira et al. |
| 10,491,466 B1 | 11/2019 | Hira et al. |
| 10,491,516 B2 | 11/2019 | Ram et al. |
| 10,567,482 B2 | 2/2020 | Ram et al. |
| 10,601,705 B2 | 3/2020 | Hira et al. |
| 2002/0062217 A1 | 5/2002 | Fujimori |
| 2002/0199007 A1 | 12/2002 | Clayton et al. |
| 2007/0186281 A1 | 8/2007 | McAlister |
| 2007/0226795 A1 | 9/2007 | Conti et al. |
| 2007/0256073 A1 | 11/2007 | Troung et al. |
| 2008/0104692 A1 | 5/2008 | McAlister |
| 2008/0225888 A1 | 9/2008 | Valluri et al. |
| 2010/0037311 A1 | 2/2010 | He et al. |
| 2010/0112974 A1 | 5/2010 | Sahai et al. |
| 2010/0318609 A1 | 12/2010 | Lahiri et al. |
| 2011/0317703 A1 | 12/2011 | Dunbar et al. |
| 2012/0082063 A1 | 4/2012 | Fujita |
| 2013/0044636 A1 | 2/2013 | Koponen et al. |
| 2013/0044641 A1 | 2/2013 | Koponen et al. |
| 2013/0044763 A1 | 2/2013 | Koponen et al. |
| 2013/0058208 A1 | 3/2013 | Pfaff et al. |
| 2013/0125230 A1 | 5/2013 | Koponen et al. |
| 2013/0198740 A1 | 8/2013 | Arroyo et al. |
| 2013/0263118 A1 | 10/2013 | Kannan et al. |
| 2013/0287026 A1 | 10/2013 | Davie |
| 2013/0297768 A1 | 11/2013 | Singh |
| 2013/0304903 A1 | 11/2013 | Mick et al. |
| 2013/0318219 A1 | 11/2013 | Kancherla |
| 2014/0010239 A1 | 1/2014 | Xu et al. |
| 2014/0052877 A1 | 2/2014 | Mao |
| 2014/0108665 A1 | 4/2014 | Arora et al. |
| 2014/0143853 A1 | 5/2014 | Onodera |
| 2014/0156818 A1 | 6/2014 | Hunt et al. |
| 2014/0192804 A1 | 7/2014 | Ghanwani et al. |
| 2014/0226820 A1 | 8/2014 | Chopra et al. |
| 2014/0245420 A1 | 8/2014 | Tidwell et al. |
| 2014/0280961 A1 | 9/2014 | Martinez et al. |
| 2014/0317677 A1 | 10/2014 | Vaidya et al. |
| 2014/0337500 A1 | 11/2014 | Lee |
| 2014/0376560 A1 | 12/2014 | Senniappan et al. |
| 2015/0016286 A1 | 1/2015 | Ganichev et al. |
| 2015/0016460 A1 | 1/2015 | Zhang et al. |
| 2015/0052522 A1 | 2/2015 | Chanda et al. |
| 2015/0052525 A1 | 2/2015 | Raghu |
| 2015/0063360 A1 | 3/2015 | Thakkar et al. |
| 2015/0063364 A1 | 3/2015 | Thakkar et al. |
| 2015/0096011 A1 | 4/2015 | Watt |
| 2015/0098465 A1 | 4/2015 | Pete et al. |
| 2015/0103838 A1 | 4/2015 | Zhang et al. |
| 2015/0106804 A1 | 4/2015 | Chandrashekhar et al. |
| 2015/0124645 A1 | 5/2015 | Yadav et al. |
| 2015/0128245 A1 | 5/2015 | Brown |
| 2015/0139238 A1* | 5/2015 | Pourzandi ............... H04L 45/42 370/392 |
| 2015/0163145 A1 | 6/2015 | Pettit et al. |
| 2015/0172183 A1 | 6/2015 | DeCusatis et al. |
| 2015/0172331 A1 | 6/2015 | Raman |
| 2015/0263983 A1 | 9/2015 | Brennan et al. |
| 2015/0263992 A1 | 9/2015 | Kuch et al. |
| 2015/0264077 A1 | 9/2015 | Berger et al. |
| 2015/0271303 A1 | 9/2015 | Neginhal et al. |
| 2015/0281098 A1 | 10/2015 | Pettit et al. |
| 2015/0281274 A1 | 10/2015 | Masurekar et al. |
| 2015/0295800 A1 | 10/2015 | Bala et al. |
| 2015/0373012 A1* | 12/2015 | Bartz .................. H04L 63/0823 726/7 |
| 2016/0055019 A1 | 2/2016 | Thakkar et al. |
| 2016/0072888 A1 | 3/2016 | Jung et al. |
| 2016/0094364 A1 | 3/2016 | Subramaniyam et al. |
| 2016/0094661 A1 | 3/2016 | Jain et al. |
| 2016/0105488 A1 | 4/2016 | Thakkar et al. |
| 2016/0124742 A1 | 5/2016 | Rangasamy et al. |
| 2016/0134418 A1 | 5/2016 | Liu et al. |
| 2016/0182567 A1 | 6/2016 | Sood et al. |
| 2016/0191304 A1 | 6/2016 | Muller |
| 2016/0198003 A1 | 7/2016 | Luft |
| 2016/0274926 A1 | 9/2016 | Narasimhamurthy et al. |
| 2016/0308762 A1 | 10/2016 | Teng et al. |
| 2016/0337329 A1 | 11/2016 | Sood et al. |
| 2016/0352623 A1 | 12/2016 | Jayabalan et al. |
| 2016/0352682 A1 | 12/2016 | Chang et al. |
| 2016/0352747 A1 | 12/2016 | Khan et al. |
| 2016/0364575 A1 | 12/2016 | Caporal et al. |
| 2017/0005923 A1 | 1/2017 | Babakian |
| 2017/0006053 A1 | 1/2017 | Greenberg et al. |
| 2017/0034129 A1 | 2/2017 | Sawant et al. |
| 2017/0034198 A1 | 2/2017 | Powers et al. |
| 2017/0060628 A1 | 3/2017 | Tarasuk-Levin et al. |
| 2017/0091458 A1 | 3/2017 | Gupta et al. |
| 2017/0091717 A1 | 3/2017 | Chandraghatgi et al. |
| 2017/0093646 A1 | 3/2017 | Chanda et al. |
| 2017/0097841 A1 | 4/2017 | Chang et al. |
| 2017/0099188 A1 | 4/2017 | Chang et al. |
| 2017/0104365 A1 | 4/2017 | Ghosh et al. |
| 2017/0111230 A1 | 4/2017 | Srinivasan et al. |
| 2017/0118115 A1 | 4/2017 | Tsuji |
| 2017/0126552 A1 | 5/2017 | Pfaff et al. |
| 2017/0142012 A1 | 5/2017 | Thakkar et al. |
| 2017/0163442 A1 | 6/2017 | Shen et al. |
| 2017/0195217 A1 | 7/2017 | Parasmal et al. |
| 2017/0222928 A1 | 8/2017 | Johnsen et al. |
| 2017/0223518 A1 | 8/2017 | Upadhyaya et al. |
| 2017/0230241 A1 | 8/2017 | Neginhal et al. |
| 2017/0279826 A1 | 9/2017 | Mohanty et al. |
| 2017/0289060 A1 | 10/2017 | Aftab et al. |
| 2017/0302529 A1 | 10/2017 | Agarwal et al. |
| 2017/0310580 A1 | 10/2017 | Caldwell et al. |
| 2017/0324848 A1 | 11/2017 | Johnsen et al. |
| 2017/0359304 A1 | 12/2017 | Benny et al. |
| 2018/0006943 A1 | 1/2018 | Dubey |
| 2018/0013791 A1 | 1/2018 | Healey et al. |
| 2018/0026873 A1 | 1/2018 | Cheng et al. |
| 2018/0026944 A1 | 1/2018 | Phillips |
| 2018/0027012 A1 | 1/2018 | Srinivasan et al. |
| 2018/0027079 A1 | 1/2018 | Ali et al. |
| 2018/0053001 A1 | 2/2018 | Folco et al. |
| 2018/0062880 A1 | 3/2018 | Yu et al. |
| 2018/0062881 A1 | 3/2018 | Chandrashekhar et al. |
| 2018/0062917 A1 | 3/2018 | Chandrashekhar et al. |
| 2018/0062923 A1 | 3/2018 | Katrekar et al. |
| 2018/0062933 A1 | 3/2018 | Hira et al. |
| 2018/0063036 A1 | 3/2018 | Chandrashekhar et al. |
| 2018/0063086 A1 | 3/2018 | Hira et al. |

(56) References Cited

U.S. PATENT DOCUMENTS

| | | |
|---|---|---|
| 2018/0063087 A1 | 3/2018 | Hira et al. |
| 2018/0063176 A1 | 3/2018 | Katrekar et al. |
| 2018/0063193 A1 | 3/2018 | Chandrashekhar et al. |
| 2018/0077048 A1 | 3/2018 | Kubota et al. |
| 2018/0115586 A1 | 4/2018 | Chou et al. |
| 2018/0197122 A1 | 7/2018 | Kadt et al. |
| 2018/0336158 A1 | 11/2018 | Iyer et al. |
| 2019/0037033 A1 | 1/2019 | Khakimov et al. |
| 2019/0068493 A1 | 2/2019 | Ram et al. |
| 2019/0068689 A1 | 2/2019 | Ram et al. |
| 2019/0173780 A1 | 6/2019 | Hira et al. |
| 2019/0306185 A1 | 10/2019 | Katrekar et al. |
| 2020/0007497 A1 | 1/2020 | Jain et al. |
| 2020/0067733 A1 | 2/2020 | Hira et al. |
| 2020/0067734 A1 | 2/2020 | Hira et al. |
| 2020/0177670 A1 | 6/2020 | Ram et al. |

FOREIGN PATENT DOCUMENTS

| | | | |
|---|---|---|---|
| JP | 2014075731 A | | 4/2014 |
| WO | 2016159113 A1 | | 10/2016 |
| WO | 2018044341 A1 | | 3/2018 |
| WO | 2019040720 A1 | | 2/2019 |
| WO | 2019112704 A1 | | 6/2019 |
| WO | 2020005540 A1 | | 1/2020 |
| WO | 2020041074 A1 | | 2/2020 |

OTHER PUBLICATIONS

Author Unknown, "Network Controller," Dec. 16, 2014, 4 pages, available at: https://web.archive.org/web/20150414112014/https://technet.microsoft.com/en-us/library/dn859239.aspx.

Non-Published Commonly Owned International Patent Application PCT/US18/57186, filed Oct. 23, 2018, 50 pages, Nicira, Inc.

Sunliang, Huang, "Future SDN-based Data Center Network," Nov. 15, 2013, 5 pages, ZTE Corporation, available at http://wwwen.zte.com.cn/endata/magazine/ztetechnologies/2013/no6/articles/201311/t20131115_412737.html.

Koponen, Teemu, et al., "Network Virtualization in Multi-tenant Datacenters," Proceedings of the 11th USENIX Symposium on Networked Systems Design and Implementation (NSD'14), Apr. 2-4, 2014, 15 pages, Seattle, WA, USA.

PCT International Search Report and Written Opinion dated Jun. 28, 2017 for commonly owned International Patent Application PCT/US17/013827, 19 pages, Nicira, Inc.

Firestone, Daniel, "VFP: A Virtual Switch Platform for Host SDN in the Public Cloud," 14th USENIX Symposium on Networked Systems Design and Implementation, Mar. 27-29, 2017, 15 pages, USENIX, Boston, MA, USA.

Non-Published commonly Owned U.S. Appl. No. 16/447,872, filed Jun. 20, 2019, 124 pages, Nicira, Inc.

Wenjie, Zhu (Jerry), "Next Generation Service Overlay Networks," IEEE P1903 NGSON (3GPP Draft), Aug. 22, 2014, 24 pages, IEEE.

PCT International Search Report and Written Opinion dated Mar. 1, 2019 for commonly owned International Patent Application PCT/US2018/057186, 14 pages, International Searching Authority (EPO).

\* cited by examiner

US 10,862,753 B2

HIGH AVAILABILITY FOR STATEFUL SERVICES IN PUBLIC CLOUD LOGICAL NETWORKS

BACKGROUND

A common datacenter setup includes numerous servers that host virtual machines or other data compute nodes, with forwarding elements (e.g., software virtual switches) in the virtualization software of the server handling packet forwarding and network security for these data compute nodes. In a private datacenter (e.g., an enterprise network), technology exists that allows the owner of the datacenter to control the hypervisors of the host servers and thereby implement their own security and packet forwarding rules.

Public datacenters provide companies with the ability to expand or move their networks out of their own private datacenters, thereby reducing the cost and other burdens of the physical servers and the regular upkeep required for them. Typically, at least a larger company network will be spread across multiple datacenters (e.g., multiple datacenters of a single public cloud provider). These public cloud providers typically charge more for data traffic sent between datacenters than for data traffic sent within a datacenter, and therefore minimizing inter-datacenter traffic while maintaining the benefits of having multiple datacenters (e.g., protection in case of equipment or network failure) is a goal.

BRIEF SUMMARY

Some embodiments provide a method for implementing high availability logical network gateways in a public multi-tenant cloud (e.g., one or more public multi-tenant datacenters). The logical network gateways, in some embodiments, provide stateful services such as firewall, network address translation (NAT), load balancing, virtual private networking (VPN), etc. for data traffic between a logical network implemented at least partially in the public cloud and external entities (e.g., external client devices that communicate with the logical network). These logical network gateways are implemented in the public cloud in high availability pairs, with active gateways and standby gateways operating in different physical locations (e.g., different physical datacenters of the cloud).

In some embodiments, the stateful services are defined within a logical router that includes (northbound) logical interfaces for connection to the external network and (southbound) logical interfaces to which other logical forwarding elements of the logical network (e.g., logical switches) connect. A network control system (e.g., a management plane of a network control system that includes management plane and central control plane functions) defines both distributed and centralized routing components for the logical router, with the centralized routing components implementing the stateful services. These centralized routing components are deployed in gateway appliances within the public cloud, which may operate within data compute nodes (DCNs) (e.g., virtual machines) hosted on public cloud host machines.

When a logical network spans multiple physical locations of a public cloud (e.g., locations that the public cloud provider counts as separate for accounting and/or address assignment purposes), some embodiments define a separate centralized routing component for each such physical location. These centralized routing components are then deployed in active-standby pairs. For a centralized routing component defined for a first physical location, the active instance is assigned to operate within a DCN in the first physical location while the standby instance operates within a DCN in a second physical location. These DCNs may implement multiple centralized routing components for different physical locations. For example, the DCN operating the active instance in the first physical location may also implement standby instances of centralized routing components for second, third, etc. physical locations.

The forwarding elements implementing the logical network (e.g., the logical switches and distributed routing component) in a particular physical location are configured to send outgoing data messages to the centralized routing component for the particular physical location. In some embodiments, the distributed routing component implemented by these forwarding elements is configured to use a first route for northbound data messages specifying the active instance of the centralized routing component for the particular physical location as a next hop and a second route specifying the standby instance of the centralized routing component for the particular physical location as a next hop. The forwarding elements are configured with the first route having a higher priority (e.g., priority X) and the second route having a slightly lower priority (e.g., priority X−1) so that the second route will be used only if the active instance is not operational.

In some embodiments, the forwarding elements implementing the logical network within the public cloud operate on the DCNs that connect to the logical network (e.g., the DCNs that run applications such as web servers, etc.). These DCNs also operate local controllers that configure the respective forwarding elements (i.e., a local controller on a DCN configures the forwarding element on the same DCN), and which receive configuration data from a gateway controller for the physical location. In some embodiments, each physical location in the public cloud includes a gateway controller that receives configuration instructions from a centralized control plane (e.g., operating in a private datacenter) and distributes the configuration instructions to the local controllers in the physical location. This gateway controller operates in the same DCN as the centralized routing component for the physical location in some embodiments (though may use a different network interface than the centralized routing component).

As mentioned, the centralized routing components provide stateful services for data traffic between the logical network DCNs and external entities. These external entities communicate with the logical network DCNs using a public network address (e.g., an IP address), while a cloud provider forwarding element converts this public network address into a network address of an interface of the DCN on which the centralized routing component operates. However, because the active and standby instances of the centralized routing component operate at two different physical locations, in some embodiments the cloud provider requires that the instances use different network addresses for their interfaces as the different physical locations use different subnets. The cloud provider maps the public network address to the network address of the active instance interface unless notified of a new mapping from the public network address to the network address of the standby instance interface (which occurs if the active instance fails).

In case the active instance fails and the data traffic between the logical network DCNs and external entities will be processed by the standby instance, the active instance regularly shares its connection state with the standby instance. However, as mentioned, these two instances have different network addresses, so the connection state from the active instance may not be valid for the standby instance. For instance, stateful data indicating that traffic from a particular external entity addressed to the active instance network address should be sent to a particular logical network DCN will not be valid because the active instance network address is not meaningful on the standby instance. The connection state data may indicate existing connections (e.g., for a firewall that only allows outbound traffic if initiated by an incoming request, or vice versa), current NAT and/or load balancing rules, etc.).

To solve this issue, the stateful service rules are distributed from the central control plane using the public network address. Each of the instances of the centralized routing component (i.e., the active instance and any standby instances) stores not only a mapping of the public network address to their own respective interface network address, but also a mapping between the equivalent interface addresses. Thus, the standby instance stores the equivalence between the active interface network address and its own interface network address.

When the standby instance receives a set of connection state data from the active instance, the standby instance maps all of the occurrences of the active instance interface network address to its own interface network address before storing the connection state data. In addition, each instance maps the public network address in the stateful service rules to its own interface network address. Thus, when the standby instance begins receiving data traffic after a failure of the active instance, both its service rules as well as the current connection state will be in terms of its own interface network address.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for implementing high availability logical network gateways in a public multi-tenant cloud (e.g., one or more public multi-tenant datacenters). The logical network gateways, in some embodiments, provide stateful services such as firewall, network address translation (NAT), load balancing, virtual private networking (VPN), etc. for data traffic between a logical network implemented at least partially in the public cloud and external entities (e.g., external client devices that communicate with the logical network). These logical network gateways are implemented in the public cloud in high availability pairs, with active gateways and standby gateways operating in different physical locations (e.g., different physical datacenters of the cloud).

Figure 1:
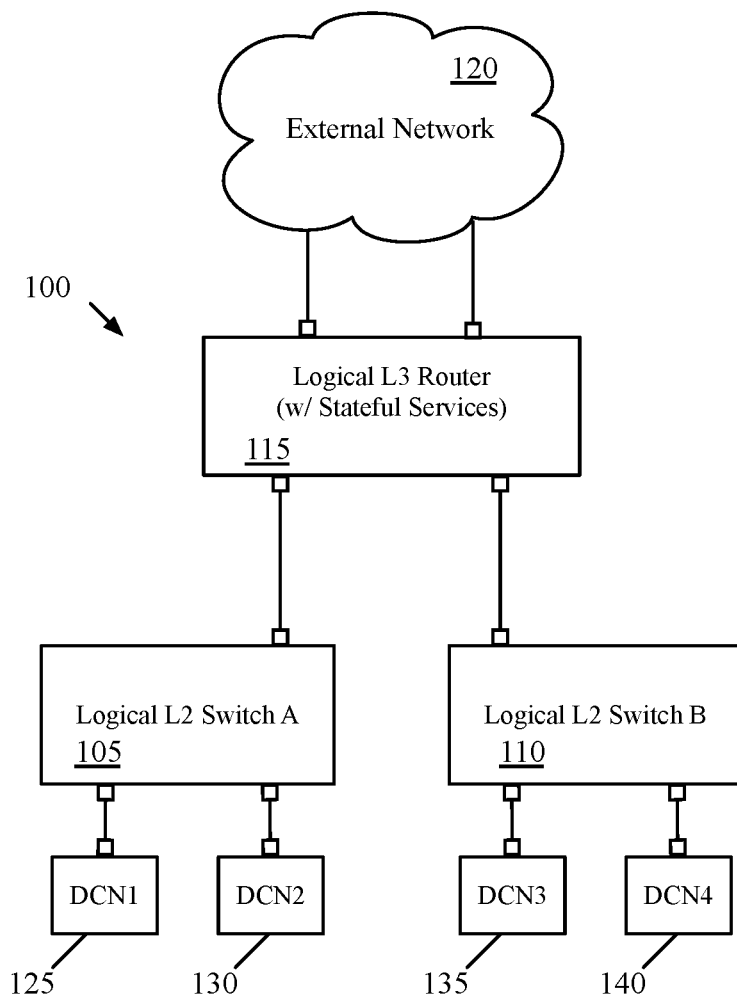
FIG. 1 conceptually illustrates such a logical network of some embodiments.

In some embodiments, the stateful services are defined within a logical router that includes (northbound) logical interfaces for connection to the external network and (southbound) logical interfaces to which other logical forwarding elements of the logical network (e.g., logical switches) connect. FIG. 1 conceptually illustrates such a logical network 100 of some embodiments. The logical network 100 is an abstraction of a network that is implemented in a distributed manner by multiple physical managed forwarding elements (which may be software forwarding elements, hardware forwarding elements, or a combination thereof). The logical network 100 is configured by, e.g., a network administrator that defines the logical network through a network management tool or similar interface to a network control system.

As shown, the logical network 100 includes two logical switches 105 and 110 to which data compute nodes (DCNs)

125-140 logically connect via logical ports. The two logical switches 105 and 110 also include logical ports that connect to a logical router 115, for which one or more stateful services (e.g., firewall, NAT, load balancing, VPN, etc.) are configured. The logical router 115 includes southbound logical ports to which the logical switches connect, as well as northbound uplink interfaces that connect the logical network 100 to an external network 120 (e.g., the Internet), allowing the DCNs of the logical network to exchange data traffic with external entities (e.g., client devices).

In some embodiments, the network control system (e.g., network managers and/or controllers) defines multiple routing components for the logical router 115. Specifically, some embodiments define a distributed routing component (referred to herein as a distributed router, or DR) and one or more centralized routing components (referred to herein as service routers, or SRs). The DR is implemented in a distributed manner along with the logical switches, whereas the SRs are implemented in centralized logical network gateways. The SRs implement both the connection to the external network and any stateful services defined for the logical router 115. This enables the connection to external networks to be managed at a limited number of points, and also enables the use of stateful services (which are more difficult to distribute). The definition of a DR and SRs for logical routers is described in greater detail in U.S. Pat. No. 9,787,605, which is incorporated herein by reference.

A logical network such as network 100 may be implemented in a private datacenter in which the logical network administrator has control over the forwarding elements operating in virtualization software of the host machines (e.g., a typical enterprise datacenter) or, as in this invention, implemented in a public multi-tenant cloud. Specifically, some embodiments implement logical networks across multiple physical locations (e.g., datacenters) of a public cloud. Using multiple datacenters may be done for redundancy purposes. For instance, a logical switch may have several redundant web servers connected, which are distributed across multiple datacenters in case of a problem at one of the datacenters.

Figure 2:
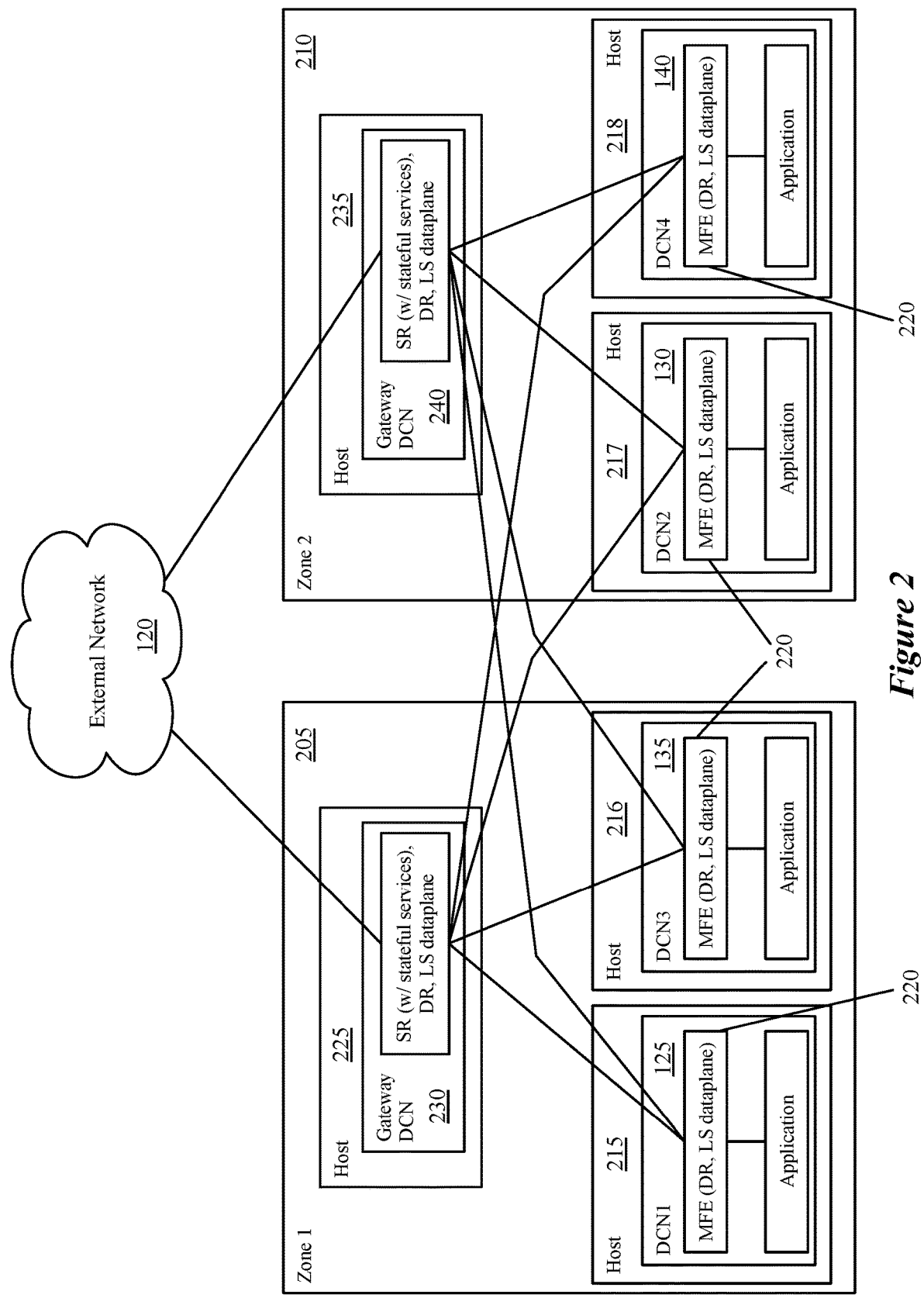
FIG. 2 conceptually illustrates the physical implementation of the logical network of FIG. 1 across multiple physical locations of a public cloud in some embodiments.

FIG. 2 conceptually illustrates the physical implementation of the logical network 100 across multiple physical locations of a public cloud in some embodiments. Specifically, in this case, the logical network 100 is split across two zones 205 and 210 (e.g., different physical locations, such as different datacenters) of a public cloud. In this case, the public cloud provider charges higher fees for data traffic sent across zone boundaries than for data traffic sent within a zone. In addition, in some embodiments, the zones are separate for network address assignment purposes (i.e., the interfaces of DCNs in different zones must be on different subnets).

As shown, the four DCNs operate on hosts 215-218, two of which are located in the first zone 205 and two of which are located in the second zone 210. Because the tenant does not have access to control of the host virtualization software forwarding elements, these forwarding elements (not shown in the figure) do not implement the logical network. Instead, some embodiments operate managed forwarding elements (MFEs) 220 within the DCNs 125-140, with applications (e.g., web server applications, etc.) also operating on the same DCNs. To send a packet to other DCNs in the logical network, an application sends the packet to the MFE on its DCN, which performs logical network processing and sends the packet (via the forwarding elements managed by the cloud provider, possibly using an overlay network) to the destination DCN. As shown, the MFEs 220 implement the two logical switches 105 and 110 as well as the DR of the logical router 115. The implementation of the logical network within a public datacenter is described in further detail in U.S. patent application Ser. No. 15/367,157, now issued as U.S. Pat. No. 10,333,959, which is incorporated herein by reference.

In addition, a SR is implemented in a gateway DCN operating on a host within each of the zones 205 and 210. Specifically, the host 225 in the first zone 205 operates a gateway DCN 230, while a host 235 in the second zone 210 operates a gateway DCN 240. Each of these gateway DCNs executes at least one datapath implementing the logical network, including an SR (in addition to the distributed logical forwarding elements, such as the logical switches and DR).

Some embodiments, as described further below, define a separate SR for each of the zones 205 and 210, so that the MFEs on hosts 215 and 216 preferentially send data traffic to the SR for zone 205 while the MFEs on hosts 217 and 218 preferentially send data traffic to the SR for zone 210. In addition, some embodiments operate these SRs in high availability mode, with an active instance of the SR for a particular zone implemented on the gateway DCN in that zone and a standby instance of the SR for the particular zone implemented on the gateway DCN in a different zone. In this case, the SR for the first zone 205 would have its active instance implemented on the gateway DCN 230 and its standby instance implemented on the gateway DCN 240, while the SR for the second zone 210 would have its active instance implemented on the gateway DCN 240 and its standby instance implemented on the gateway DCN 230.

Figure 3:
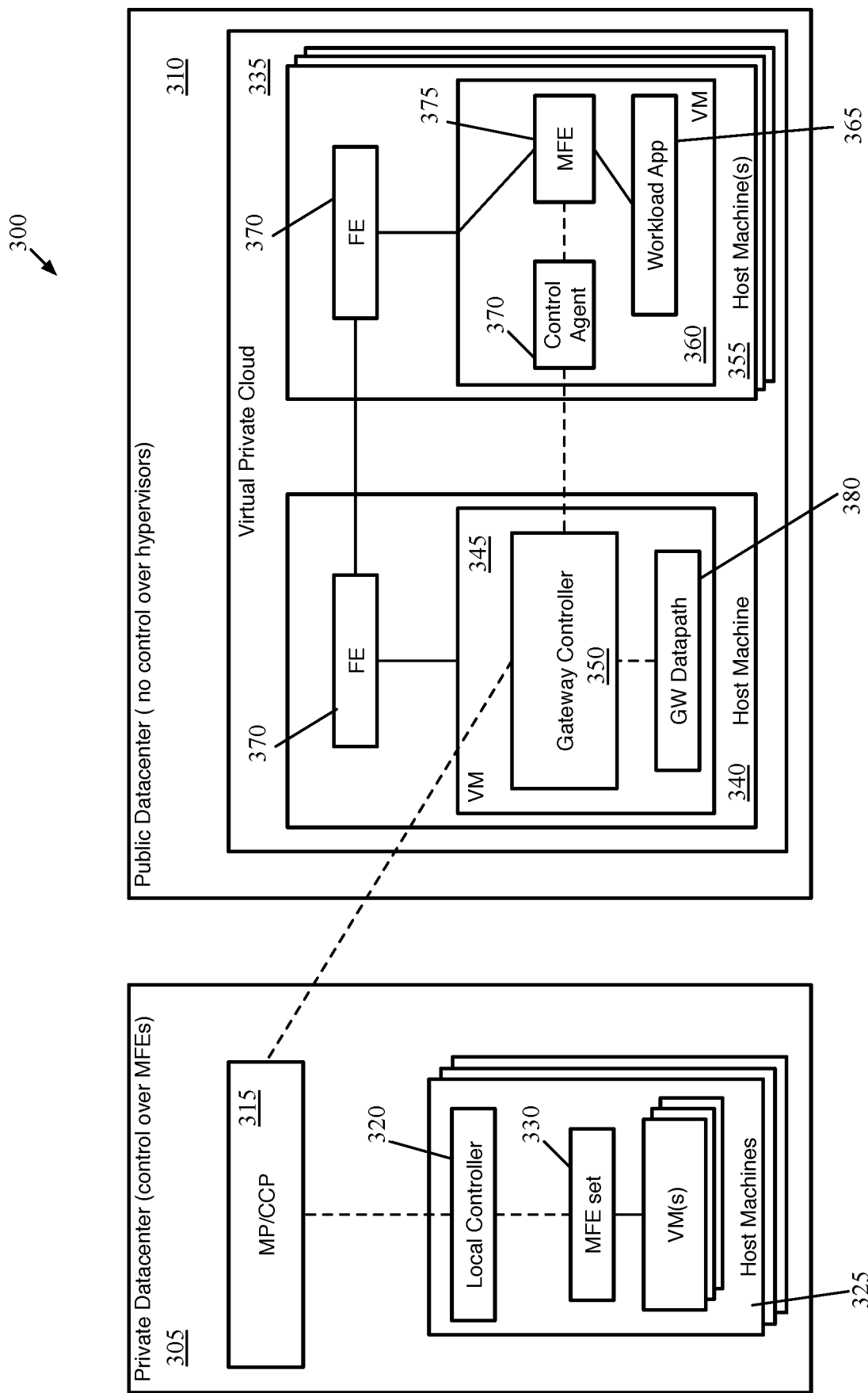
FIG. 3 conceptually illustrates a network control system of some embodiments that manages forwarding elements in both a private datacenter and at least one public datacenter.

As mentioned, in some embodiments the MFEs (and the gateway DCN datapaths) are configured by a network control system that receives a logical network configuration, defines configuration data based on the logical network configuration, and distributes this configuration to the various forwarding elements that implement the logical network. FIG. 3 conceptually illustrates such a network control system 300 of some embodiments that manages forwarding elements in both a private datacenter 305 and at least one public datacenter 310. Both of the datacenters 305 and 310 include host machines for hosting VMs or other DCNs. In the private datacenter 305, the network control system has the ability to manage the hypervisors (virtualization software), and therefore the forwarding elements that are part of those hypervisors. However, in the public datacenter 310, the network control system does not have access to the hypervisors, as these are controlled by the owner of the datacenter.

The network control system within the private datacenter includes a management plane/central control plane (MP/CCP) cluster 315 and a local controller 320 on each of numerous host machines 325. The local controller 320 exercises direct control over a set of managed forwarding elements (MFEs) 330 on the host machine. As shown, VMs (or other DCNs) on the host machine connect to the MFE set 330 in order to send and receive data traffic. Based on forwarding and configuration data received via the network control system, the MFE set 330 performs forwarding and network security (e.g., distributed firewall (DFW) rules, access control list (ACL) rules, etc.) operations on the data packets sent to and from these VMs. The MFE set may be a single managed forwarding element (e.g., a single virtual switch that performs L2, L3, and additional processing) in some embodiments, or may be a combination of various managed forwarding and security elements (e.g., a set of filters, L2 switch(es), L3 router(s), etc. that all operate within the virtualization software).

As described herein, the MP/CCP cluster 315 includes a management plane and central control plane with distinct features. In some such embodiments, the MP and CCP are separate applications that may operate on the same or different physical machines. In addition, the MP/CCP cluster 315 of some embodiments may include a single management plane application or a cluster of management plane applications, a single central control plane application or a cluster of central control plane applications, and any combination thereof.

In some embodiments, the management plane provides application programming interfaces (APIs) through which administrators (e.g., via a cloud management application) of the private datacenter 305 enter configuration data to configure one or more logical networks to be implemented within the private datacenter 305 and/or one or more public datacenter(s). FIG. 1 conceptually illustrates an example of such a logical network configuration. The logical network configuration data may also include network address translation (NAT) rules, load balancing rules, rules for sending packets to third-party services, network security rules (e.g., DFW rules), etc.

The management plane of some embodiments converts the logical network configuration into rules defining logical forwarding elements (e.g., logical switches & routers), logical ports for the logical forwarding elements, security and encryption rules for the logical ports, etc. The central control plane of some embodiments handles the distribution of these rules to the appropriate MFEs (using, e.g., stored data indicating the location in the physical network of the DCN for each logical port). Upon receiving a rule for a particular logical port and/or logical forwarding element, the central control plane identifies the span for that rule (i.e., the MFEs that need to receive the rule in order to properly implement the logical network) and distributes the rule to local controllers 320 that directly interact with the MFEs 330 on their respective host machines 325.

In the public datacenter 310, FIG. 3 illustrates a virtual private cloud (VPC) 335 created for the owner of the private datacenter 305 (referred to herein as the tenant of the public datacenter). The virtual private cloud 335 (or similar constructs) is a logically isolated set of resources of the public datacenter 310 over which the tenant has control. With some cloud providers, the tenant can define a virtual network with network subnets and routing tables, and/or place their VMs into security groups (that are defined by the public cloud provider). However, the tenant does not have direct control over the forwarding elements in the cloud provider network. While this figure illustrates a single datacenter and single VPC, it should be understood that the network control system components will be replicated in other datacenters as well in some embodiments.

Within the VPC, the figure illustrates (i) a first host machine 340 that hosts a VM 345 with a gateway controller 350 and gateway datapath 380 and (ii) a set of additional host machines 355 that host VMs 360 with workload applications 365. It should be understood that while the host machines 340 and 355 are shown as being part of the VPC, these host machines may also host additional VMs belonging to different VPCs (of the same or other tenants) in some embodiments. As shown, each of the host machines 340 and 355 includes a forwarding element 370. In some embodiments, the host machines include forwarding elements within their virtualization software that are managed by the public cloud provider. The network control system 300, however, has no access to these forwarding elements, as they are part of the cloud provider network.

The VM 345, in some embodiments, is a prepackaged machine image that includes a gateway controller 350. The gateway controller 350 receives data from the MP/CCP cluster 315 (e.g., from the central control plane application) for all of the logical ports implemented within the VPC 335. In some embodiments, in the view of the MP/CCP cluster 315, the gateway controller is equivalent to a local controller 320 with numerous logical ports connected (assuming there are numerous logical ports in the VPC 335). As such, the MP/CCP cluster 315 identifies the gateway controller 350 as a recipient for all of the configuration rules required for any of the logical ports in the VPC 335. The gateway VM 345 also operates a gateway datapath 380 for implementing one or more SRs for the logical network to provide centralized stateful services (e.g., NAT, load balancing, etc.) and for processing/routing packets sent between the VMs 360 and external sources (e.g., via the Internet). The gateway VM of some embodiments is described in greater detail below by reference to FIG. 7.

The VMs 360 are workload VMs, each of which runs a workload application 365 (e.g., a web server, application server, database server, etc.). In addition, to enable first-hop processing configurable by the network control system 300, each of these VMs also operates a control agent 370 and a managed forwarding element 375 (e.g., a virtual switch such as Open vSwitch). The gateway controller 350, upon receiving a configuration rule, identifies the span of that rule within the VPC 335 (i.e., the various MFEs 375 that require the rule), and passes these configuration rules to the appropriate control agents 370. The control agent 370 uses this data to configure the MFE 375 to apply networking and/or security rules to packet sent to and from the workload application 365, similar to how the local controller 320 configures the MFEs 330.

As noted above, the SRs for each zone of a public cloud are deployed in active-standby pairs in some embodiments. For an SR defined for a first zone, in some embodiments the active instance is assigned to operate within a gateway DCN in the first zone while the standby instance operates within a gateway DCN in a second zone. These DCNs may implement multiple SRs for different physical locations. For example, the DCN operating the active instance in the first physical location may also implement standby instances of centralized routing components for second, third, etc. physical locations.

Figure 4:
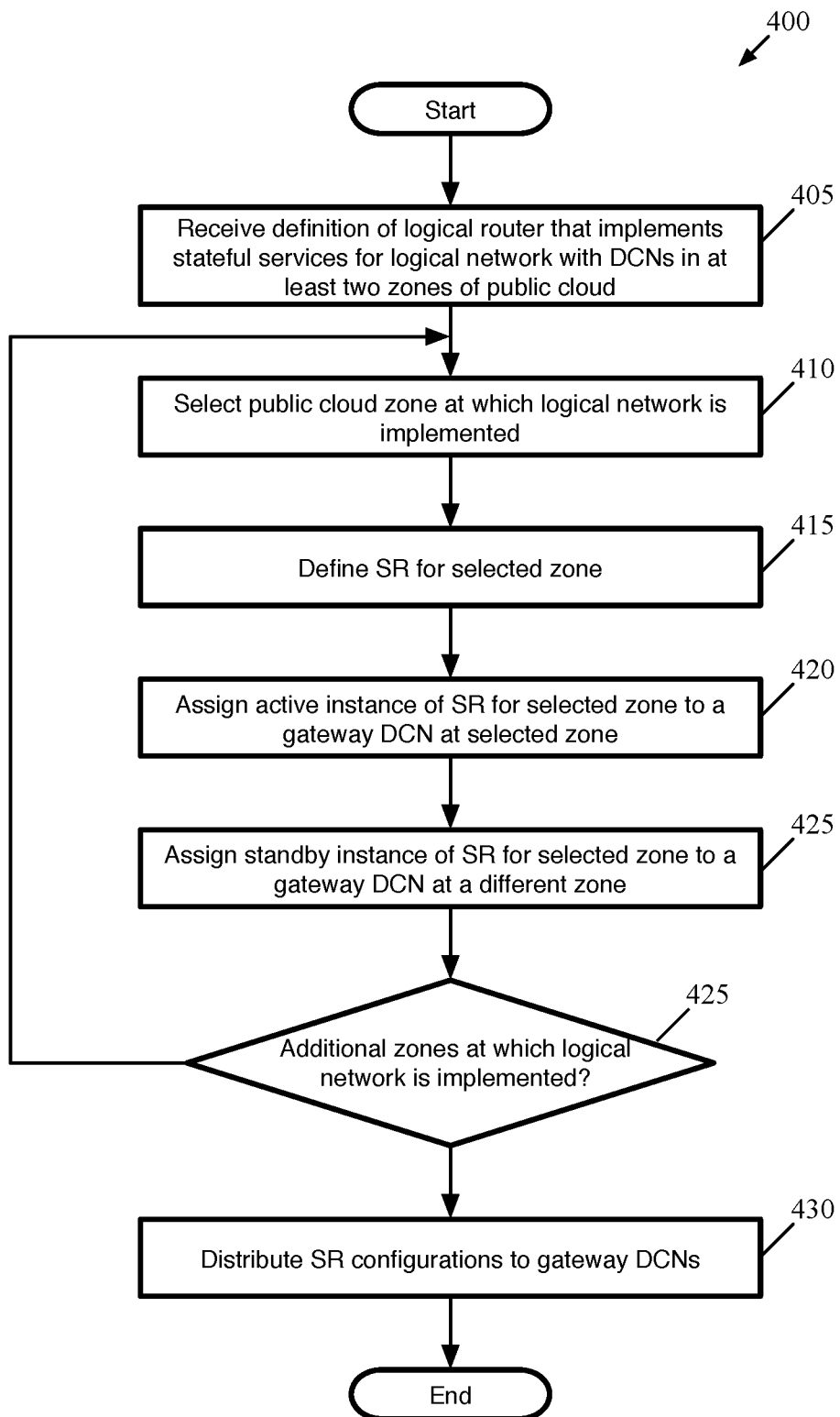
FIG. 4 conceptually illustrates a process of some embodiments for assigning active and standby SRs to gateway DCNs in different zones of a public cloud.

FIG. 4 conceptually illustrates a process 400 of some embodiments for assigning active and standby SRs to gateway DCNs in different zones of a public cloud. In some embodiments, the process 400 is performed by the management plane (or a combined management plane and central control plane) of a network control system such as that shown in FIG. 3.

As shown, the process 400 begins by receiving (at 405) a definition of a logical router that implements stateful services for a logical network with DCNs that operate (or will operate) in at least two zones of a public cloud. For smaller logical networks that only exist within a single public cloud zone, some embodiments define a single SR operating within that zone (possibly with active and standby instances both in the same zone). In some embodiments, the management plane receives this logical router definition from an administrator through its APIs along with the configuration for other aspects of the logical network. The administrator defines the logical router interfaces (e.g., its connections to logical switches, its uplink interfaces that connect to external networks, etc.), the various stateful services and rules for those stateful services (e.g., firewall rules such as whether to allow incoming-initiated and/or outgoing-initiated connections, NAT rules, rules for load balancing across sets of DCNs, etc.), and any other aspects of the logical router. In some embodiments, the administrator specifies in the configuration which public cloud zones are used to host the DCNs, while in other embodiments the management plane and/or central control plane includes a module for interacting with public cloud provider APIs to discover this information.

Next, the process 400 then selects (at 410) one of the public cloud zones at which the logical network is implemented. While the process 400 is illustrated as a serialized process in which the separate zones are treated one at a time, it should be understood that in some embodiments the operations 415-425 may be performed at least partly in parallel for the various zones. In addition, in some embodiments, a new zone may be added at a later time, in which case the operations 415-425 are performed when the zone is added.

The process 400 defines (at 415) an SR for the selected zone. This definition includes a definition of various stateful service rules, a routing table, etc. Some embodiments define an uplink interface of the logical router for each public cloud zone that requires an SR, and thus define one SR for each uplink interface. In some embodiments, each uplink interface may be assigned one or more public IP addresses by the public cloud provider, which is in charge of routing traffic for the public IP address to the SR.

Next, the process 400 assigns (at 420) an active instance of the SR for the selected zone to a gateway DCN at the selected zone. In order to minimize data traffic sent from one zone to another, the active gateway for a zone is always preferentially located in that zone. The process also assigns (at 425) a standby instance of the SR for the selected zone to a gateway DCN at a different zone. Some embodiments define a single standby instance for each SR, while other embodiments define multiple standby instances for some or all SRs. For instance, a logical network deployed across three zones could have three SRs, each with one active and two standby instances. In assigning the active and standby instances, some embodiments assign network addresses (e.g., IP addresses) for the uplink and local overlay interfaces of the SR datapath. The assignment and use of these network addresses is described in greater detail below.

The process 400 then determines (at 425) whether additional zones at which the logical network is implemented remain. If this is the case, the process returns to 410 to define an SR and assign its active and standby instances for the next zone. Otherwise, the process 400 distributes (at 430) the SR configurations to the assigned gateway DCNs. In some embodiments, the management plane provides the various SR configurations and gateway DCN assignment to the central control plane, which distributes the appropriate configuration data to the gateway controllers at each zone. The gateway controllers, which operate on the gateway DCNs in some embodiments, then configure the SR datapaths according to the received configurations.

Figure 5:
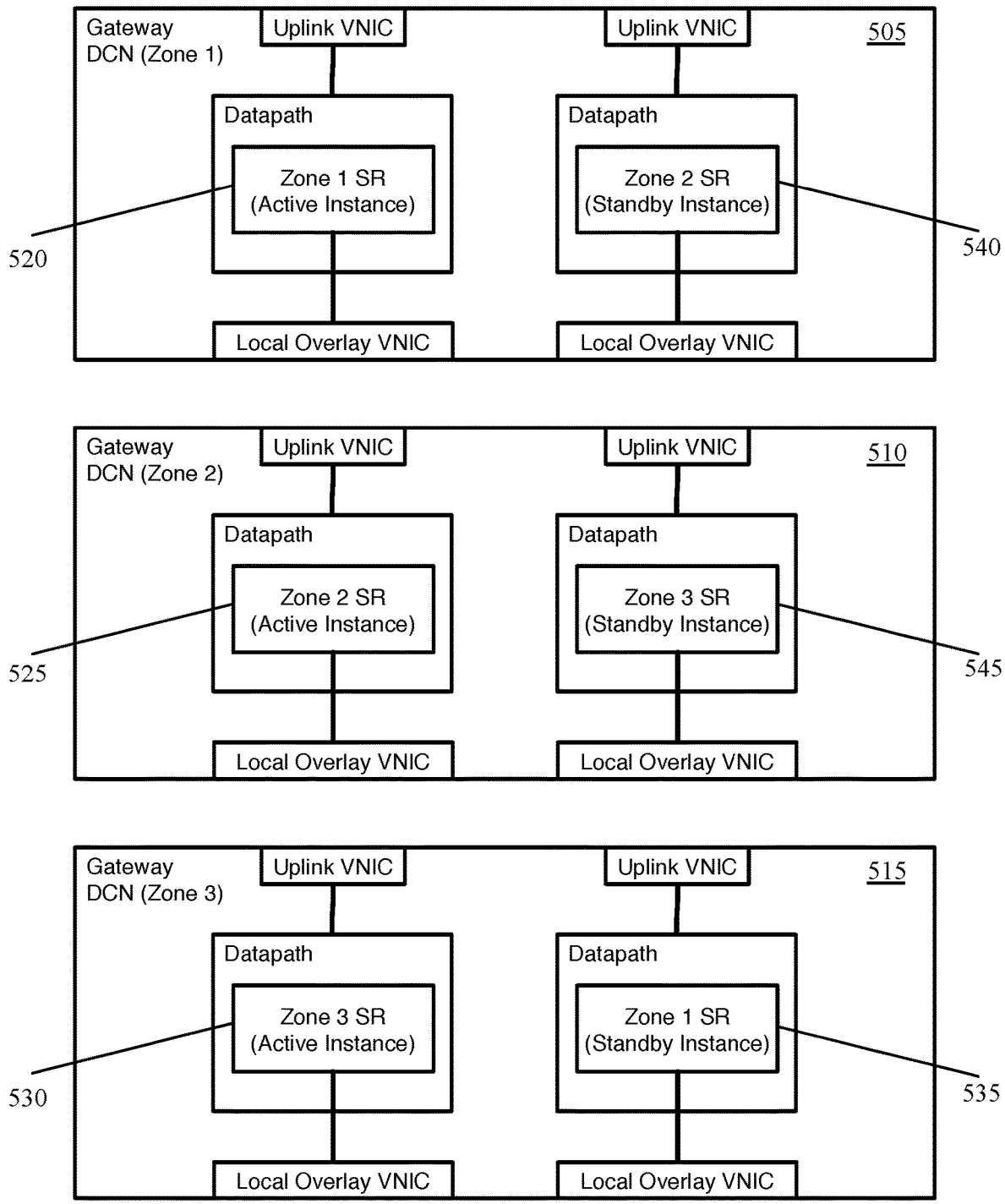
FIG. 5 conceptually illustrates the assignment of active and standby instances for SRs for a logical router of a logical network deployed across three public cloud zones.

FIG. 5 conceptually illustrates the assignment of active and standby instances for SRs for a logical router of a logical network deployed across three public cloud zones. This figure illustrates three gateway DCNs 505-515, one operating in each zone (for simplicity, neither the other logical network DCNs nor the other modules executing on the gateway DCNs are shown in this figure). The gateway DCNs are described in greater detail below by reference to FIG. 7.

Each of the gateway DCNs 505-515 executes an active instance of the SR for its own zone: the gateway DCN 505 in zone 1 executes the active instance 520 of the SR for zone 1, the gateway DCN 510 in zone 2 executes the active instance 525 of the SR for zone 2, and the gateway DCN 515 in zone 3 executes the active instance 530 of the SR for zone 3. In addition, in this example, each of the gateway DCNs 505-515 executes a standby instance of the SR for a different zone: the gateway DCN 505 in zone 1 executes the standby instance 540 of the SR for zone 2, the gateway DCN 510 in zone 2 executes the standby instance 545 of the SR for zone 3, and the gateway DCN 515 in zone 3 executes the standby instance 535 of the SR for zone 1.

As shown in the figure, each of the SR instances is implemented within a datapath of the gateway DCN. This may be a datapath development kit (DPDK)-based datapath, a forwarding element such as Open vSwitch (OVS), or other datapath implementations. In addition, each SR datapath is attached to an uplink virtual network interface controller (VNIC) that is north-facing (i.e., for receiving communications from external networks) and a local overlay VNIC that is south-facing (i.e., for receiving communications from logical network DCNs). Each of these VNICs has a different IP address in some embodiments.

Though not shown in the figure, each of the datapaths also executes the other logical forwarding elements of the logical network (e.g., the DR and any logical switches). Using first-hop processing, incoming (southbound) data packets are processed through the SR as well as the DR and appropriate logical switch at the gateway DCN (for outgoing traffic, the majority of the logical processing occurs at the MFE operating on the source DCN). Though shown here as separate datapaths for each SR, in some embodiments a single datapath executes on each gateway DCN. Multiple local overlay VNICs and uplink VNICs each connect to this single datapath in this case, which executes the correct SR according to the VNIC on which the packet is received (possibly in addition to other rules).

The MFEs that operate in the DCNs in a particular zone to implement the logical switches and DR are configured in some embodiments to send outgoing data messages to the SR for the particular zone. In some embodiments, the DR implemented by these forwarding elements is configured to use a first route for northbound data messages specifying the active instance of the SR for the particular zone as a next hop and a second route specifying the standby instance of the SR for the particular zone as a next hop. The forwarding elements are configured with the first route having a higher priority (e.g., priority X) and the second route having a slightly lower priority (e.g., priority X−1) so that the second route will be used only if the active instance is not operational.

Figure 6:
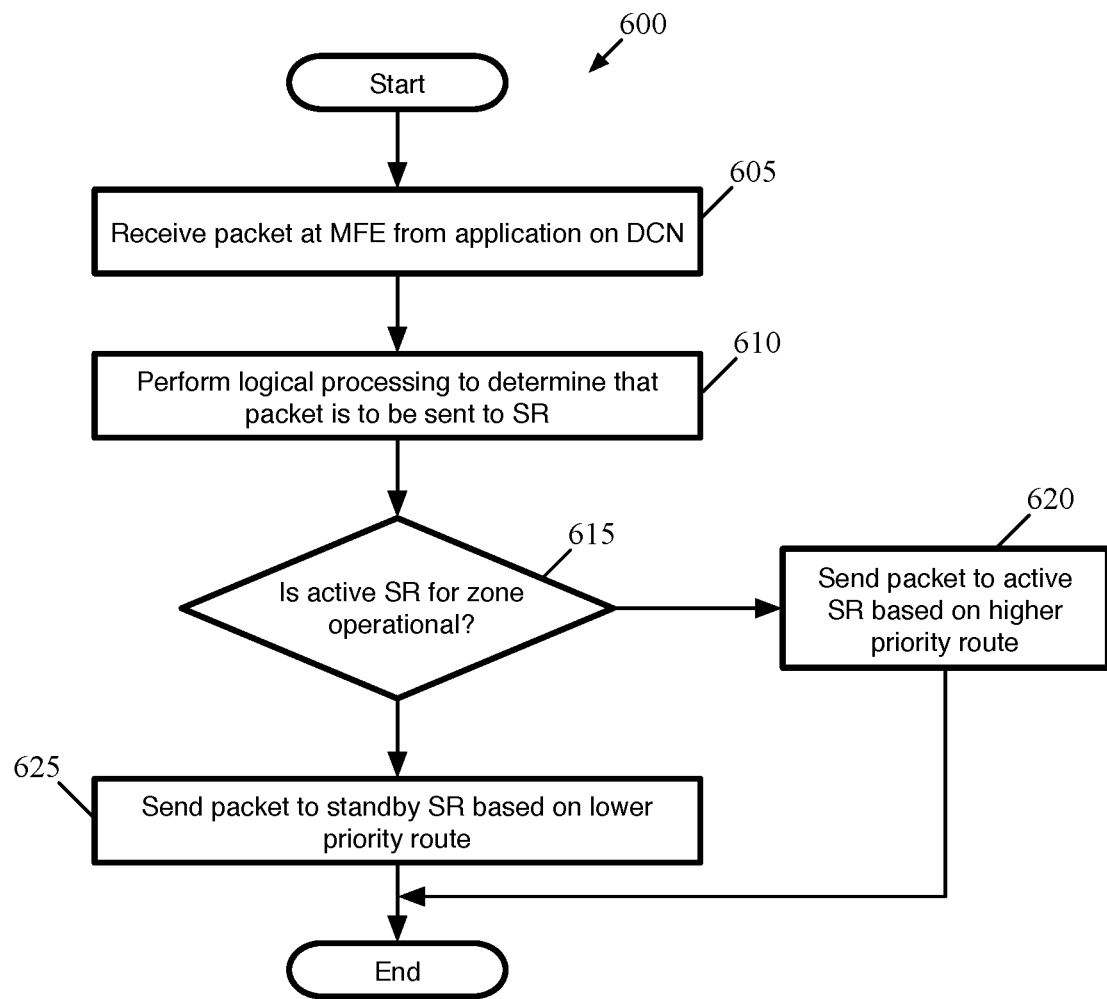
FIG. 6 conceptually illustrates a process of some embodiments for processing outbound logical network data packets.

FIG. 6 conceptually illustrates a process 600 of some embodiments for processing outbound logical network data packets. The process 600, in some embodiments, is performed by an MFE executing on a logical network DCN that resides in a public cloud (e.g., one of the MFEs 220 of FIG. 2). The logical network is implemented across at least two zones of the public cloud, and includes a logical router with active and standby SRs for each zone.

As shown, the process 600 begins by receiving (at 605) a packet at the MFE from an application on the same DCN as the MFE. In some embodiments, the application sends the packet to the MFE via an internal port of the MFE, as described in greater detail in U.S. patent application Ser. No. 15/367,157, which is incorporated by reference above.

Next, the process performs (at 610) logical processing on the packet to determine that the packet needs to be sent to the SR. This may include performing logical switch processing to determine that the packet should be processed by the DR, and then performing logical routing for the DR, at which point the MFE determines to send the packet to the SR (e.g., using a default route that routes outgoing traffic (to non-logical network IP addresses) to the SR). In addition, other security processes (e.g., distributed firewall operations) are applied to the packet.

The process then determines (at 615) whether the active SR for the zone is operational (i.e., the active SR located in the same zone as the MFE). In some embodiments, the MFE trades regular keep-alive signals (e.g., using bidirectional forwarding detection (BFD)) with the gateways hosting both the active and standby SRs (or just the gateway hosting the active SR) to ensure that the active SR is operational, and flags the route to an SR to not be used if the gateway hosting the SR is down.

If the active SR is operational, the process 600 sends (at 620) the packet to the active SR instance based on its higher priority route. On the other hand, if the active SR instance is not currently operational, the process sends (at 625) the packet to a standby SR instance based on its lower priority route. In some cases, there may be more than one standby SR instance, in which case they are ordered by priority, and the packet is sent to the highest priority instance that is currently operational. In some embodiments, to send the packet to one of the SRs, the MFE encapsulates the packet using an IP address assigned to the DCN on which the MFE operates by the cloud provider (which may be different from the logical network IP address used by the application that initially sent the packet).

It should be understood that in some embodiments, the MFE does not make a specific decision to send the packet to the SR separate from the decision as to whether the active SR is operational. Instead, the MFE performs DR processing to route the packet, which results in a decision to send the packet to the active instance of the SR if that instance is operational and a decision to send the packet to the standby instance of the SR if the active instance is not operational.

As discussed above, the MFEs operating on the logical network DCNs within the public cloud to implement the logical network (e.g., the MFEs that perform the above process 600) are configured by local controllers that receive configuration data from a gateway controller. In some embodiments, each physical location (e.g., each zone) in the public cloud in which the logical network is implemented includes a gateway controller that receives configuration instructions from a centralized control plane (e.g., operating in a private datacenter) and distributes the configuration instructions to the local controllers in the zone. This gateway controller operates on the same DCN as the SR for the zone in some embodiments (though may use a different network interface than the centralized routing component).

Figure 7:
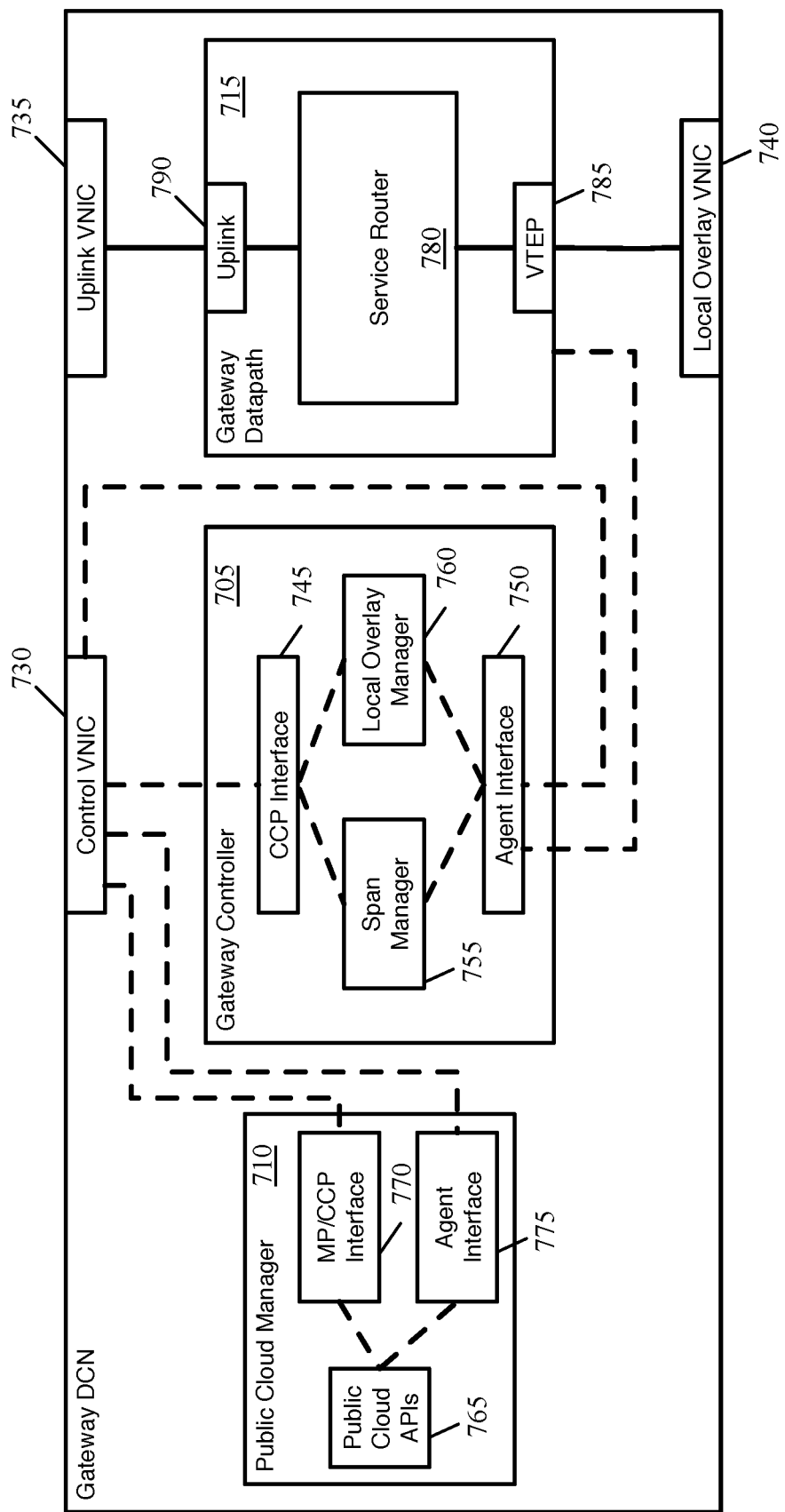
FIG. 7 conceptually illustrates the architecture of a gateway DCN of some embodiments.

FIG. 7 conceptually illustrates the architecture of such a gateway DCN 700 of some embodiments. As mentioned, in some embodiments, the gateway DCN is packaged as a pre-configured VM image (e.g., an Amazon Machine Image) for a specific cloud provider that the administrator of the logical network can instantiate as one of the DCN in the public cloud. As shown, the gateway DCN 700 includes a gateway controller 705, a public cloud manager (PCM) 710, and a gateway datapath 715. It should be understood that, in different embodiments, gateway DCNs may include different combinations of these modules as well all or some of these modules along with other modules. For example, in some embodiments, the gateway DCN may also include a distributed network encryption manager for handling the distribution of encryption keys and/or a DHCP module that acts as a DHCP server for the DCNs operating within the zone.

The gateway DCN includes three interfaces—a control VNIC 730, an uplink VNIC 735, and a local overlay VNIC 740. In some embodiments, the control VNIC 730 is used only for control path communications between the local agents on the other hosts in the VPC and the gateway controller 705, and between the MP/CCP cluster and the gateway controller 705 (as well as any communication for the PCM). The uplink VNIC 735 handles north-south packets sent from the gateway datapath 715 towards external destinations (and received from those external destinations), which will generally not be encapsulated by the datapath. The local overlay VNIC 740 handles east-west data packets that the gateway datapath processes to send packets between workload applications within its zone and DCNs in other zones of the public cloud, other public clouds, and/or an on-premises private datacenter.

The gateway controller 705 of some embodiments performs the controller functions to receive data from the centralized MP/CCP and distribute that data to the appropriate DCNs within the public cloud zone. Through the control VNIC 735, a CCP interface 745 of the gateway controller 705 receives configuration rules from the central controller and provides information back to the central controller (e.g., when a new VM is created within the zone and thus a new logical port needs to be associated with the gateway). The agent interface 750 distributes configuration data to the local agents operating on DCNs in the VPC and receives updates from these local agents when events occur on the DCN (e.g., the creation of an interface on the DCN, etc.). In some embodiments, both of these interfaces 745 and 750 are part of a netcap agent operating on the gateway DCN.

The gateway controller 705 also includes a span manager 755 and a local overlay manager 760. The span manager receives configuration rules sent from the central controller (via the CCP interface 745), determines the MFEs executing on DCNs within the public cloud zone (including, possibly the gateway datapath 715) that require these configuration rules, and sends these configuration rules to the appropriate agents in the zone. Some embodiments use different adapters and/or different queues for each agent within the zone, placing each received rule into one or more such queues.

The local overlay manager 760 handles the management of the overlay network within the zone. Assuming the MFEs in the zone are using an overlay, each agent on a DCN in the zone (and the gateway datapath 715) provides its VTEP IP address and MAC address bound to that VTEP IP address to the gateway controller 705 in some embodiments. The local overlay manager 760 of some embodiments identifies which MFEs in the zone require each provided binding, and handles the provision of this information to the MFEs in the zone so that data packets sent to the MAC address can be encapsulated using the corresponding VTEP IP address. A first MFE requires the MAC:VTEP IP binding of a second MFE if there is the possibility of the workload application attached to the first MFE sending a data packet to the workload application attached to the second MFE without the data packet being required to travel through the gateway datapath 715.

The public cloud manager (PCM) 710 of some embodiments enables the network control system to interact with the compute management system of the public cloud provider. Specifically, the PCM of some embodiments uses public cloud APIs to retrieve inventory, configuration, status, and statistics information from the public cloud provider. Though shown here operating on the gateway DCN, in other embodiments the PCM may operate in the MP/CCP cluster (e.g., in the private datacenter). As shown, the PCM includes public cloud APIs 765 and interfaces 770 and 775 for communicating with the agent and with the MP/CCP cluster. In some embodiments, the PCM only communicates directly with the management plane, and any communications to and from the agents pass through the gateway controller. The public cloud APIs 765 are used to communicate with the public cloud compute manager.

The gateway datapath 715 implements one or more SRs in some embodiments to handle packet processing for at least data packets between data compute nodes within its local zone and sources/destinations external to the logical network (e.g., clients accessing the data compute nodes through the Internet). In some embodiments, the gateway datapath implements SRs not only for the local zone but also for other cloud provider zones (e.g., as standby SR instances). The datapath 715 shows a SR 780 within the datapath, but it should be understood that the datapath may also include configuration for one or more logical switches and one or more DRs of the logical network.

In different embodiments, the datapath 715 may be a datapath development kit (DPDK)-based datapath, an OVS datapath, or another type of datapath that can be implemented within a DCN. When an OVS datapath is implemented, some embodiments use the OVS datapath for the logical switch and/or distributed router processing, while implementing a separate namespace to handle the centralized routing component processing. On the other hand, some embodiments that use a DPDK-based datapath implement the configuration for all of the logical forwarding element components within the same datapath. Additional description of the gateway datapath of some embodiments is described in U.S. Patent Publication 2016/0226759, which is incorporated herein by reference.

As shown, the datapath 715 uses two ports, a VTEP port 785 and an uplink port 790, which connect to the local overlay VNIC 740 and uplink VNIC 735 respectively. The gateway datapath 715 receives packets sent from local workloads in its zone via the VTEP 785, which uses an IP address assigned by the cloud provider on a local subnet (i.e., on the same subnet as the addresses assigned to the other logical network DCNs in the zone). This VTEP port 785 is also used for packets sent to and from DCNs in other public cloud zones or in a private datacenter, as all of this traffic is encapsulated for the logical network in some embodiments.

The uplink port 790 is used by the datapath 715 to send and receive north-south data traffic between the workloads in the VPC and external sources/destinations. These data packets are sent out of the uplink port without encapsulation (though they may be tunneled separately on the cloud provider network to a cloud provider gateway). In addition, these packets (both incoming and outgoing) may require centralized services that are configured for the SR, such as NAT, firewall rules for north-south traffic, service chaining, load balancing, etc.

As stated, the SRs provide stateful services for data traffic between the logical network DCNs and external entities. These external entities communicate with the logical network DCNs using a public network address (e.g., an IP address), while a cloud provider forwarding element converts this public network address into a network address of an interface of the DCN on which the SR operates (i.e., the uplink VNIC 735). However, because the active and standby instances of the SR operate in two different zones, in some embodiments the cloud provider requires that the instances use different network addresses for their interfaces as the different physical locations use different subnets. The cloud provider gateway maps the public network address to the network address of the active instance interface unless notified of a new mapping from the public network address to the network address of the standby instance interface (which occurs if the active instance fails).

To perform these stateful services, the MP/CCP provides the gateway controller with various configuration rules for each service, to both the active instance for an SR and any standby instances. While processing packets, the active SR instance stores connection state that is used to inform decisions about future packets (e.g., noting when a connection has been validly opened, storing load balancing decisions for connections so that future southbound packets for the connection will be routed to the correct DCN, etc.

In case the active SR instance fails and subsequent north-south data traffic will be processed by the standby SR instance, the active instance regularly shares its connection state with the standby instance. However, as mentioned, these two instances have different network addresses, so the connection state from the active instance may not be valid for the standby instance. For instance, stateful data indicating that traffic from a particular external entity addressed to the active instance network address should be sent to a particular logical network DCN will not be valid because the active instance network address is not meaningful on the standby instance.

To solve this issue, the stateful service rules are distributed from the central control plane using the public network address. Each of the instances of the centralized routing component (i.e., the active instance and any standby instances) stores not only a mapping of the public network address to their own respective interface network address, but also a mapping between the equivalent interface addresses. Thus, the standby instance stores the equivalence between the active interface network address and its own interface network address.

Figure 8:
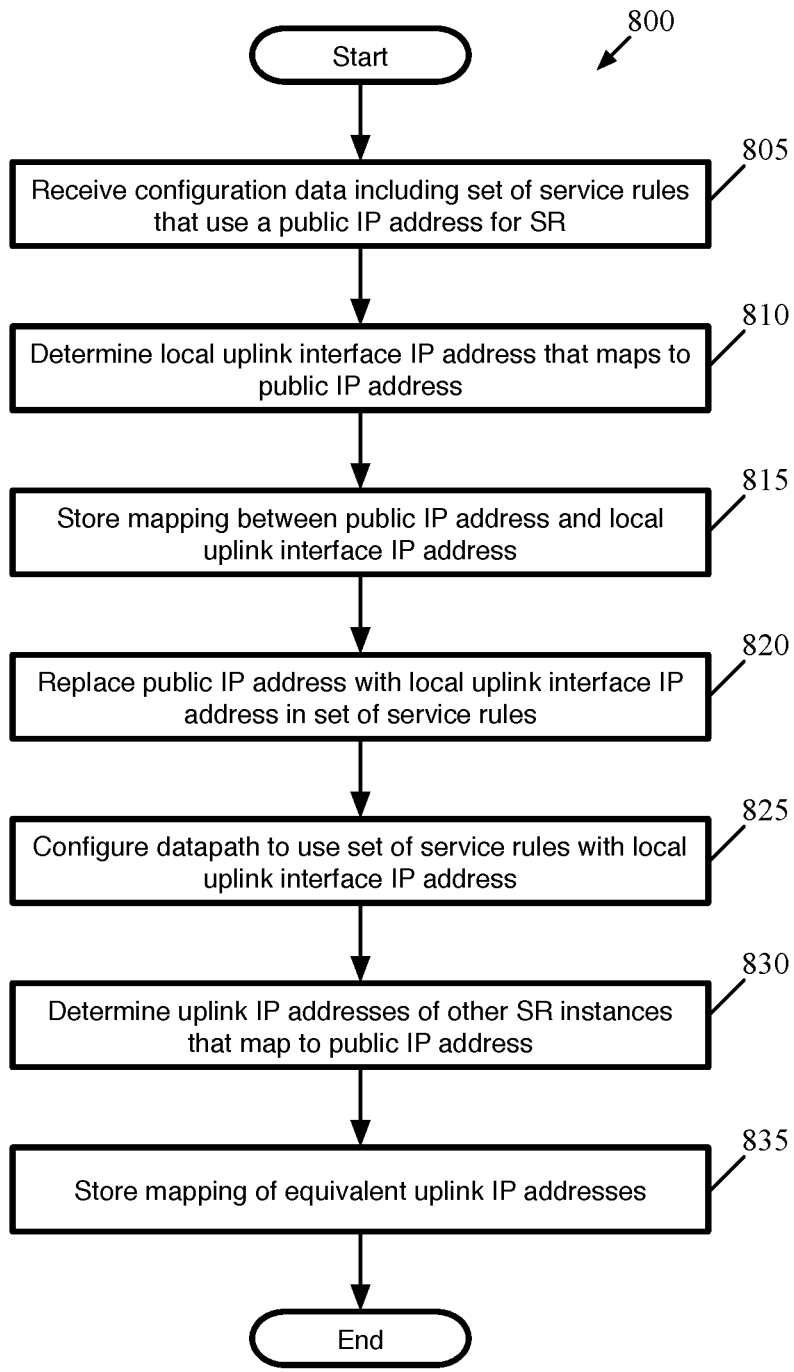
FIG. 8 conceptually illustrates a process of some embodiments for receiving stateful service configuration rules, converting those rules to use a local IP address, and storing IP address equivalency mappings.

FIG. 8 conceptually illustrates a process 800 of some embodiments for receiving stateful service configuration rules, converting those rules to use a local IP address, and storing IP address equivalency mappings. In some embodiments, the process 800 is performed by a gateway controller operating on a gateway DCN in a public cloud zone, such as the gateway DCN 700. The gateway controller receives configuration data from a central controller, and uses this data to configure the datapath operating on the same gateway DCN. The process 800 will be described in part by reference to FIGS. 9 and 10.

As shown, the process 800 of some embodiments begins by receiving (at 805) configuration data that includes a set of service rules for an SR that use a public IP address. In this case, the gateway DCN may implement an active instance or a standby instance of the SR, as the operations performed in this process are the same in either case. The public IP address is associated with both the active and standby instances of the SR, with the cloud provider (e.g., a gateway of the cloud provider) receiving these packets, performing address translation, and forwarding them to the correct gateway DCN using the IP address of an interface of the gateway DCN datapath (e.g., the uplink VNIC IP address). The service rules, rather than being written in terms of the uplink interface IP address that changes between the different instances of the SR, instead use the public IP address. These service rules may include NAT rules, load balancing rules, firewall rules, etc. In some embodiments, an SR may be associated with multiple public IP addresses, with different services using different IP addresses (and thus different interface IP addresses as well).

The process 800 also determines (at 810) a local uplink interface IP address that maps to the public IP address, and stores (at 815) this mapping between the public IP and the local interface IP. In some embodiments, this mapping is also received as configuration data from the central controller. In other embodiments, the public cloud management system stores this information and the public cloud manager of the gateway DCN interacts with the public cloud management system to learn the mapping information.

Next, the process 800 replaces (at 820) the public IP address with the local uplink interface IP address that maps to the public IP address in the set of service rules. Thus, the gateway controller for an active instance of an SR will use a first uplink interface IP address in the set of rules and the gateway controller for a standby instance of the same SR will use a second, different uplink interface IP address in the same set of rules. The uplink IP address will be the actual address used for incoming (southbound) packets received by the SR, whereas the public IP address will have been replaced in these packets and thus would not be useful for the service rules. The process 800 then configures (at 825) the datapath to use the set of service rules with the uplink interface IP address.

Figure 9:
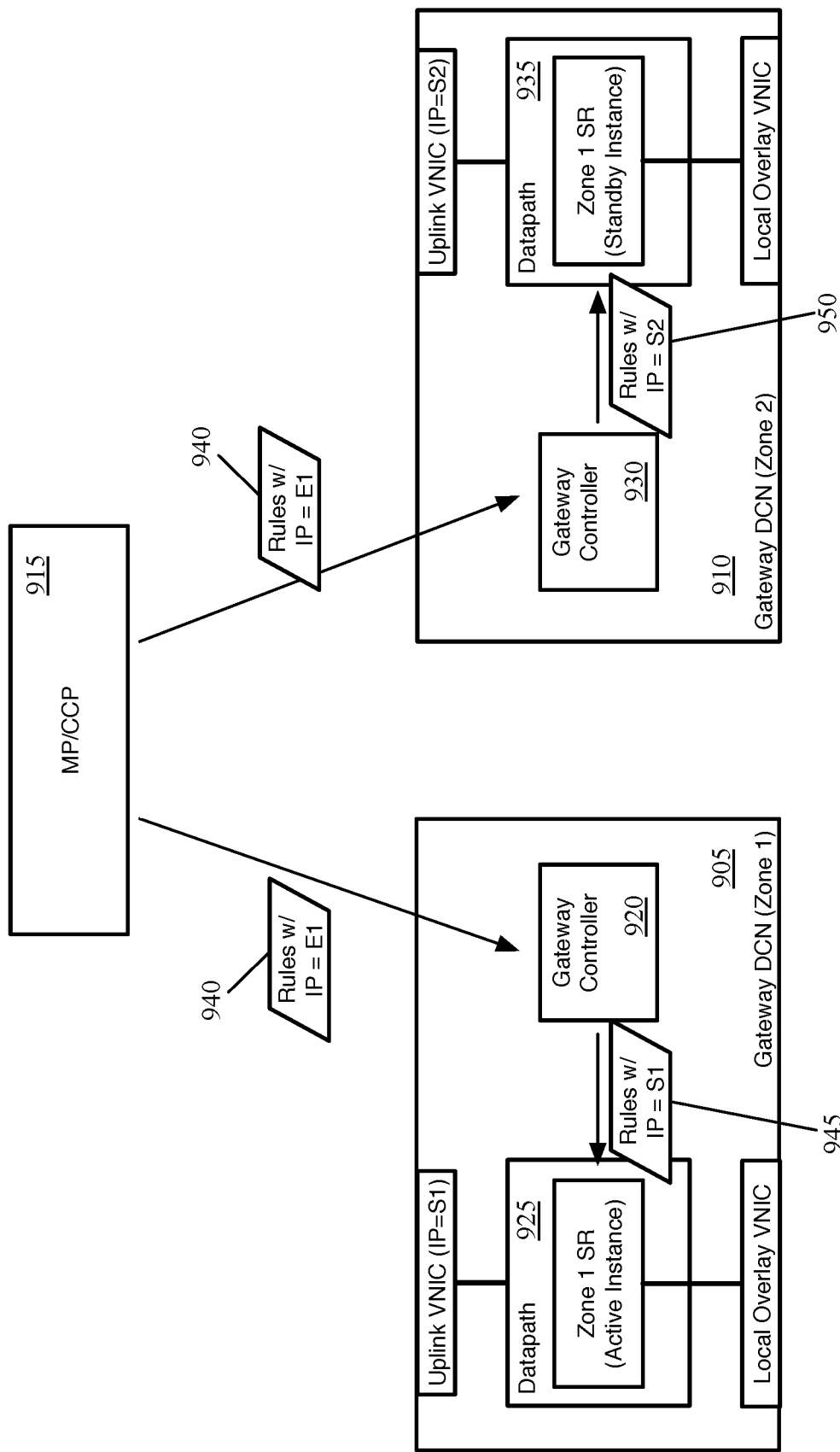
FIG. 9 conceptually illustrates gateway controllers at two different gateway DCNs receiving the same set of service configuration rules and replacing the public IP addresses with different local interface IP addresses.

FIG. 9 conceptually illustrates gateway controllers at two different gateway DCNs receiving the same set of service configuration rules and replacing the public IP addresses with different local interface IP addresses. This figure illustrates two gateway DCNs 905 and 910 and a central controller (MP/CCP) 915. The MP/CCP 915) performs management plane and/or central control plane functions, and operates in a private datacenter in some embodiments. The first gateway DCN 905 is located in a first zone of a public cloud, while the second gateway DCN 910 is located in a second zone of the public cloud. The first gateway DCN 905 includes a gateway controller 920 and a datapath 925 that implements an active instance of the SR for the first zone, while the second gateway DCN 910 includes a gateway controller 930 and a datapath 935 that implements a standby instance of the SR for the first zone. As shown, the datapath 925 uses an uplink VNIC with an IP address of S1, while the datapath 935 uses an uplink VNIC with an IP address of S2. S1 and S2 are in different IP subnets owing to being located in different zones of the public cloud.

As shown, the MP/CCP provides a set of configuration rules 940 to the gateway controllers 920 and 930. This set of configuration rules (which is the same for both gateway controllers) uses a public IP address E1. The gateway controller 920 receives this set of rules 940 and modifies the rules to replace instances of the public IP address E1 with the local uplink IP address S1. The gateway controller 920 uses this modified set of rules 945 to configure the datapath 925 to implement the stateful service to which the rules relate. Similarly, the gateway controller 930 receives the set of rules 940 and modifies the rules to replace instances of the public IP address E1 with the local uplink IP address S2. The gateway controller 930 uses this modified set of rules 950 to configure the datapath 935 to implement the stateful service to which the rules relate.

Examples of such stateful service rules could include a pair of NAT rules (for incoming and outgoing packets) that translate any packet with a destination IP address E1 to a private (logical network) address L1 (for incoming packets) and any packet with a source IP address L1 to the public IP address E1 (for outgoing packets). Upon receiving these rules, the gateway controllers would modify them so that the first gateway datapath 925 would translate the destination IP address S1 to L1 for incoming packets and source IP address L1 to S1 for outgoing packets, while the second gateway datapath 935 would translate the destination IP address S2 to L1 for incoming packets and source IP address L1 to S2 for outgoing packets.

Returning to FIG. 8, the process 800 also determines (at 830) the uplink IP addresses of the other SR instances that map to the same public IP address, and stores (at 835) the mapping of equivalent uplink IP addresses. The process 800 then ends. In the example of FIG. 9, the gateway controller 920 would identify S2 as another uplink IP address that also maps to public IP address E1. If there are numerous standby SRs, then all of the several equivalent IP addresses will be mapped together. In addition, each SR may use multiple public IP addresses that are each mapped to different uplink IP addresses, and separate equivalency mappings are stored for each.

Figure 10:
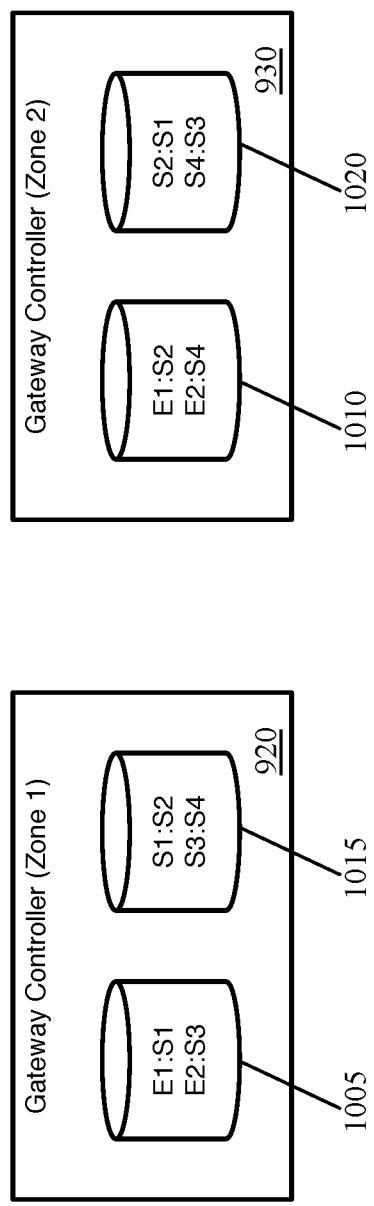
FIG. 10 conceptually illustrates the IP address mappings stored by the gateway controllers of FIG. 9 in some embodiments.

FIG. 10 conceptually illustrates the IP address mappings stored by the gateway controllers 920 and 930 in some embodiments. Each of the gateway controllers stores two sets of mappings: a first set mapping public IP addresses to local uplink IP addresses, and a set of set mapping local uplink IP addresses to equivalent uplink IP addresses used at other instances of the same SR. In some embodiments, the controller may store mappings for multiple SRs implemented by the datapath on the gateway DCN as well as for multiple public IP addresses used by the same SR.

In this case, each of the gateway controllers stores data about two public IP addresses E1 and E2, which may both be related to the same SR (for zone 1) or related to two different SRs (e.g., the zone 1 SR and the zone 2 SR). The first gateway controller 920 stores mappings 1005 of the public IP address E1 to its local uplink IP address S1 and of the public IP address E2 to its local uplink IP address S3. Similarly, the second gateway controller 930 stores mappings 1010 of the public IP address E1 to its local uplink IP address S2 and of the public IP address E2 to its local uplink IP address S4.

In addition, the first gateway controller 920 stores mappings 1015 of the equivalency between its local uplink IP address S1 and the remote uplink IP address S2 as well as between its local uplink IP address S3 and the remote uplink IP address S4. Similarly, the second gateway controller 930 stores mappings 1020 of the equivalency between its local uplink IP address S2 and the remote uplink IP address S1 as well as between its local uplink IP address S4 and the remote uplink IP address S3.

As noted, an active SR instance generates connection state data (e.g., existing connections that the firewall has allowed, current load balancing decisions for various connections, etc.) while processing packets. The active SR instance (or the gateway controller for the active SR instance) regularly (e.g., at timed intervals, whenever the connection state has been updated, etc.) shares this connection state with any of its standby SR instances (or the gateway controllers for these standby SR instances) in other public cloud zones. This way, the standby SR instances will have the data stored in case the active instance fails and one of the standby instances becomes active, at which point the DCNs that previously sent northbound traffic to the active SR instance for their zone will send this traffic to standby (now active) SR instance and the public cloud provider gateway will send traffic for the public IP address(es) associated with the SR to the standby (now active) SR instance.

When the gateway controller for a standby SR instance receives a set of connection state data from the active SR instance, the gateway controller maps all of the occurrences of the active instance uplink IP address to its own equivalent uplink IP address before providing the connection state data to the datapath for use by the SR. Thus, when the standby instance begins receiving data traffic after a failure of the active instance, both its service rules as well as the current connection state use its own uplink IP address.

Figure 11:
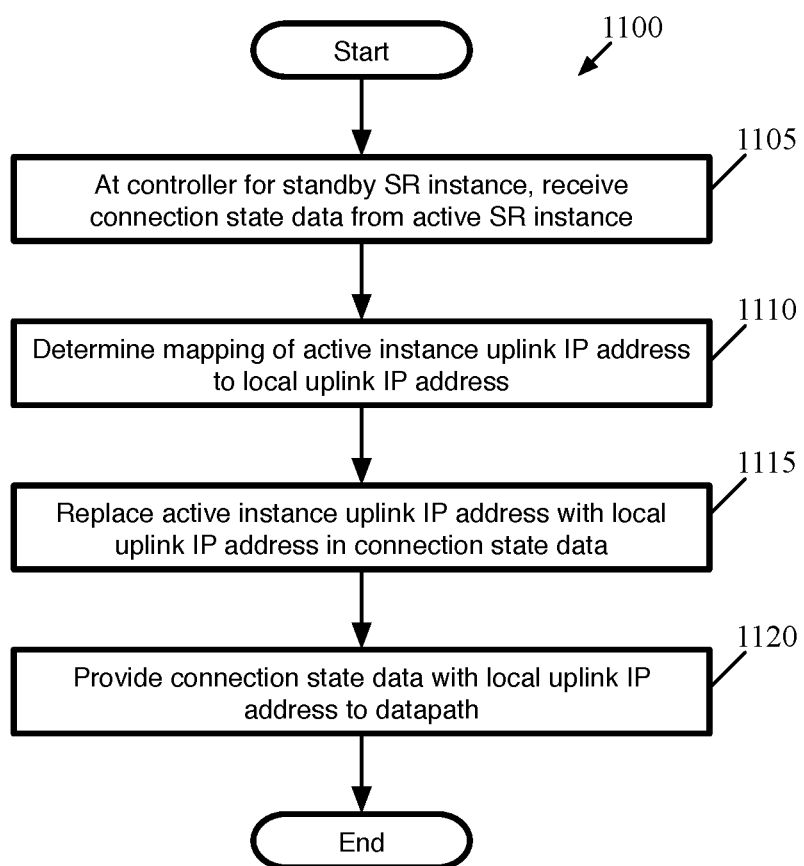
FIG. 11 conceptually illustrates a process of some embodiments for modifying connection state by replacing a remote uplink IP address with a local uplink IP address.

FIG. 11 conceptually illustrates a process 1100 of some embodiments for modifying connection state by replacing a remote uplink IP address with a local uplink IP address. In some embodiments, the process 1100 is performed by a gateway controller operating on the same DCN as the datapath that implements a standby instance of an SR. The gateway controller performs the process 1100 each time connection state data is received from the active instance of the SR. The process 1100 will be described in part by reference to FIG. 12, which illustrates connection state data generated by an active SR instance being shared with a standby instance of the SR.

As shown, the process 1100 begins by receiving (at 1105) connection state data from the active SR instance at the standby SR instance (or at the gateway controller executing on the same DCN as the standby SR instance). In some embodiments, the gateway controller for the active SR instance retrieves this data from the datapath implementing the active SR instance regularly, and sends this data (either directly or through the management plane or central control plane) to the gateway controllers for the standby instances of the SR.

Figure 12:
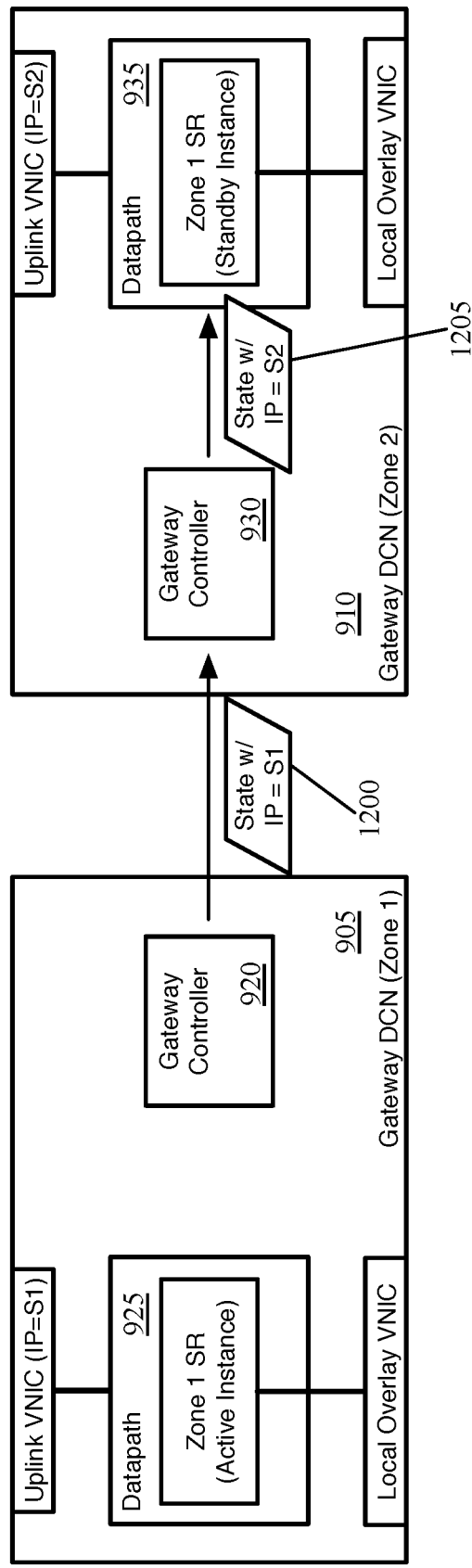
FIG. 12 illustrates connection state data generated by an active SR instance being shared with a standby instance of the SR.

FIG. 12 illustrates the gateway DCNs 905 and 910 of FIG. 9, with the datapath 925 at the first gateway DCN 905 implementing the active SR instance and the datapath 935 at the second gateway DCN 910 implementing a standby SR instance. As shown, the gateway controller 920 on the first DCN 905 provides connection state data 1200 to the gateway controller 930. This state uses the uplink IP address S1 associated with the active SR instance.

Returning to FIG. 11, the process 1100 determines (at 1110) the mapping of the active instance uplink IP address to a local uplink IP address. As shown in FIG. 10, these mappings are stored by the gateway controller in some embodiments based on data received from the MP/CCP and/or the cloud provider management system.

The process 1100 then replaces (at 1115) the active instance uplink IP address with the equivalent local uplink IP address in the received connection state data, and provides (at 825) the modified connection state data with the local uplink IP address to the datapath for storage (e.g., in a cache of the datapath). The datapath stores this data as though it was self-generated, for use in case the active SR fails and data traffic for the SR is directed to the standby instance. FIG. 12 illustrates that the gateway controller 930 has modified the connection state data to use the local uplink IP address S2 and provides this modified connection state data 1205 to the datapath 935.

Figure 13:
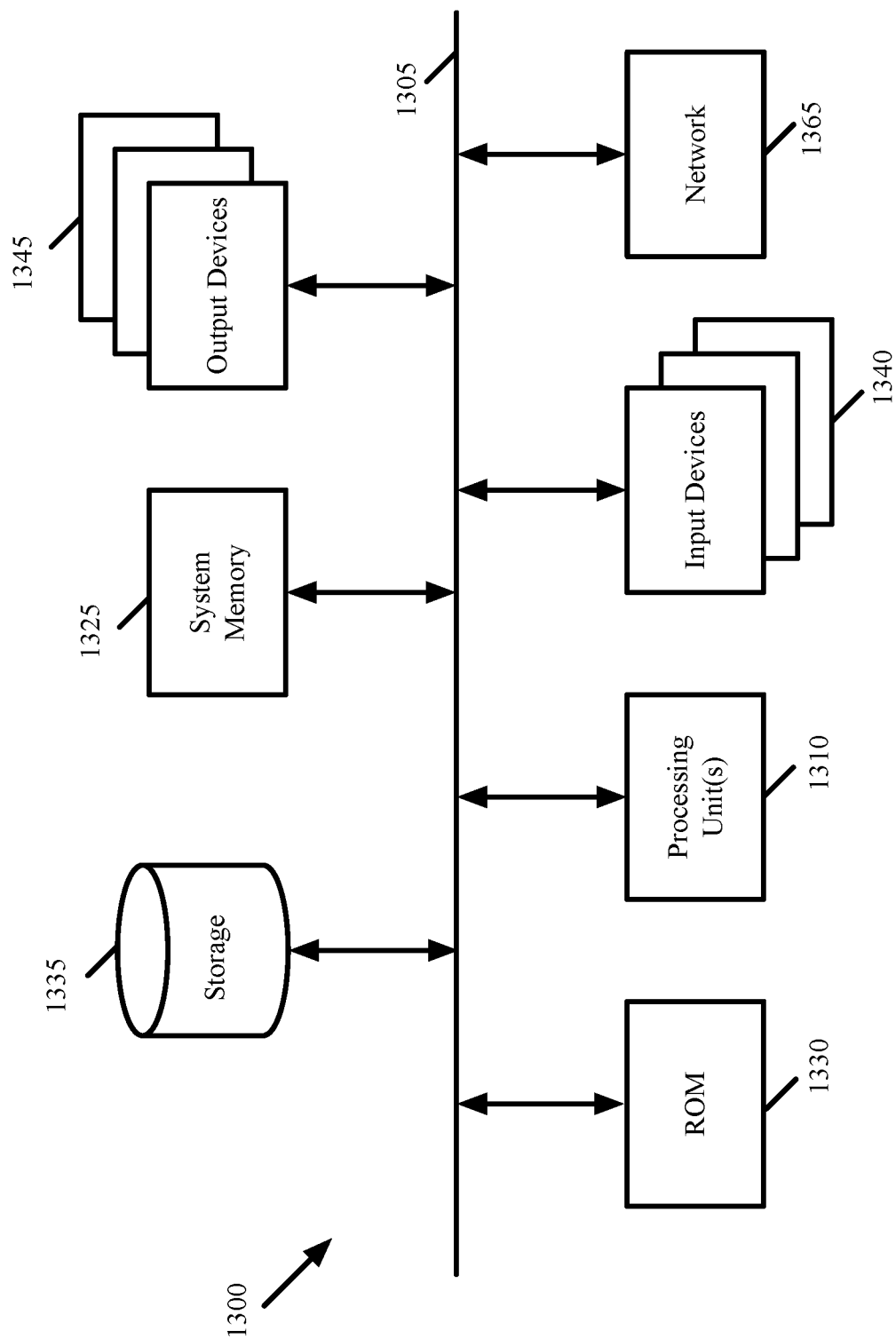
FIG. 13 conceptually illustrates an electronic system with which some embodiments of the invention are implemented.

FIG. 13 conceptually illustrates an electronic system 1300 with which some embodiments of the invention are implemented. The electronic system 1300 can be used to execute any of the control, virtualization, or operating system applications described above. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random-access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4, 6, 8 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a logical network spanning a plurality of datacenters, a method comprising:
for each datacenter hosting data compute nodes (DCNs) belonging to the logical network:
defining a centralized routing component for processing data messages between the DCNs hosted at the datacenter and networks external to the logical network;
assigning an active instance of the centralized routing component to execute on a first gateway DCN that operates on a first host computer at the datacenter; and
assigning a standby instance of the centralized routing component to execute on a second gateway DCN that operates on a second host computer at one of the other datacenters spanned by the logical network.

2. The method of claim 1, wherein the network controller operates within a private datacenter, wherein each of the plurality of datacenters is a different public datacenter.

3. The method of claim 1, wherein the active instance of a particular centralized routing component for a particular datacenter executes on a particular gateway DCN that operates on a particular host computer at the particular datacenter.

4. The method of claim 3, wherein the network controller is a first network controller, the method further comprising distributing configuration data for the active instance of the particular centralized routing component to a second network controller that executes on the particular gateway DCN.

5. The method of claim 4, wherein the second network controller and the active instance of the particular centralized routing component use different network interfaces of the particular gateway DCN.

6. The method of claim 3, wherein the standby instance of the particular centralized routing component for the particular datacenter executes on a different gateway DCN that operates on a different host computer at a different datacenter.

7. The method of claim 3, wherein the particular centralized routing component is a first centralized routing component and the particular datacenter is a first datacenter, wherein the standby instance of a second centralized routing component for a second datacenter also executes on the particular gateway DCN.

8. The method of claim 1, wherein the plurality of datacenters are different datacenters of a public cloud provider, wherein the public cloud provider charges higher fees for data traffic sent between datacenters than for data traffic sent between DCNs in a single datacenter.

9. The method of claim 1, wherein the active instance and the standby instance of each centralized routing component share connection state data.

10. The method of claim 1, wherein the DCNs belonging to the logical network at a particular datacenter operate forwarding elements that implement the logical network.

11. The method of claim 10, wherein the logical network comprises a distributed logical router, wherein the forwarding elements operating on the logical network DCNs at the particular datacenter to implement the distributed logical router include (i) a first route having a first priority that specifies the active instance of the centralized routing component for the particular datacenter and (ii) a second route having a second, lower priority that specifies the standby instance of the centralized routing component for the particular datacenter.

12. The method of claim 11, wherein the network controller is a first network controller, wherein the first and second routes are configured by a second network controller that operates in a same gateway DCN as the active instance of the centralized routing component for the particular datacenter.

13. The method of claim 11, wherein the first priority is one greater than the second priority.

14. The method of claim 11, wherein the forwarding elements operating on the logical network DCNs only send data messages from the logical network DCNs to the standby instance of the centralized routing component for the particular datacenter when the active instance of the centralized routing component for the particular datacenter is unavailable.

15. A non-transitory machine-readable medium storing a network controller program which when executed by at least one processor manages a logical network spanning a plurality of datacenters, the network controller program comprising sets of instructions for:
  for each datacenter hosting data compute nodes (DCNs) belonging to the logical network:
    defining a centralized routing component for processing data messages between the DCNs hosted at the datacenter and networks external to the logical network;
    assigning an active instance of the centralized routing component to execute on a first gateway DCN that operates on a first host computer at the datacenter; and
    assigning a standby instance of the centralized routing component to execute on a second gateway DCN that operates on a second host computer at one of the other datacenters spanned by the logical network.

16. The non-transitory machine-readable medium of claim 15, wherein the network controller program operates within a private datacenter, wherein each of the plurality of datacenters is a different public datacenter.

17. The non-transitory machine-readable medium of claim 15, wherein the active instance of a particular centralized routing component for a particular datacenter executes on a particular gateway DCN that operates on a particular host computer at the particular datacenter.

18. The non-transitory machine-readable medium of claim 17, wherein the network controller program is a first network controller, the method further comprising distributing configuration data for the active instance of the particular centralized routing component to a second network controller that executes on the particular gateway DCN.

19. The non-transitory machine-readable medium of claim 17, wherein the standby instance of the particular centralized routing component for the particular datacenter executes on a different gateway DCN that operates on a different host computer at a different datacenter.

20. The non-transitory machine-readable medium of claim 17, wherein the particular centralized routing component is a first centralized routing component and the particular datacenter is a first datacenter, wherein the standby instance of a second centralized routing component for a second datacenter also executes on the particular gateway DCN.

21. The non-transitory machine-readable medium of claim 15, wherein:
  the DCNs belonging to the logical network at a particular datacenter operate forwarding elements that implement the logical network;
  the logical network comprises a distributed logical router; and
  the forwarding elements operating on the logical network DCNs at the particular datacenter to implement the distributed logical router include (i) a first route having a first priority that specifies the active instance of the centralized routing component for the particular datacenter and (ii) a second route having a second, lower priority that specifies the standby instance of the centralized routing component for the particular datacenter.

22. The non-transitory machine-readable medium of claim 21, wherein the forwarding elements operating on the logical network DCNs only send data messages from the logical network DCNs to the standby instance of the centralized routing component for the particular datacenter when the active instance of the centralized routing component for the particular datacenter is unavailable.

* * * * *